(12) United States Patent
Aronovich et al.

(10) Patent No.: US 10,721,179 B2
(45) Date of Patent: Jul. 21, 2020

(54) ADAPTIVE RESOURCE ALLOCATION OPERATIONS BASED ON HISTORICAL DATA IN A DISTRIBUTED COMPUTING ENVIRONMENT

(71) Applicant: INTERNATIONAL BUSINESS MACHINES CORPORATION, Armonk, NY (US)

(72) Inventors: Lior Aronovich, Thornhill (CA); Khalid Ahmed, Markham (CA); Vincenzo Pasquantonio, Bradford (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 275 days.

(21) Appl. No.: 15/819,238

(22) Filed: Nov. 21, 2017

(65) Prior Publication Data
US 2019/0158417 A1   May 23, 2019

(51) Int. Cl.
*G06F 15/173* (2006.01)
*H04L 12/911* (2013.01)
(Continued)

(52) U.S. Cl.
CPC .......... *H04L 47/70* (2013.01); *H04L 41/0823* (2013.01); *H04L 67/10* (2013.01); *H04L 67/12* (2013.01); *H04L 67/22* (2013.01)

(58) Field of Classification Search
CPC . H04L 41/0806; H04L 41/0823; H04L 47/70; H04L 47/821–823; H04L 47/827; H04L 9/0836; H04L 63/10
(Continued)

(56) References Cited

U.S. PATENT DOCUMENTS 5,978,771 A    11/1999  Vandivier, III
7,590,736 B2   9/2009   Hydrie et al.
(Continued)

FOREIGN PATENT DOCUMENTS

CN    1577281 A      2/2005
CN    102576354 A    7/2012
(Continued)

OTHER PUBLICATIONS

Dave, "Understanding Database Scalability—Horizontal and Vertical Scalability Better Together," blog.sqlauthority.com, Nov. 11, 2016 (3 pages).
(Continued)

*Primary Examiner* — Wing F Chan
*Assistant Examiner* — Andrew Woo
(74) *Attorney, Agent, or Firm* — Griffiths & Seaton PLLC

(57) ABSTRACT

Various embodiments for adaptively computing and implementing changes in resource allocations using historical data in a distributed computing environment. Historical data on resource consumption levels of an application is maintained. Either of an increase operation or reduction operation is triggered for a resource required by an application instance of the application, where a predicted consumption level for the resource required by the application instance is computed. The increase or reduction operation is computed and implemented for the resource required by the application instance to accommodate the predicted consumption level, thereby optimizing application efficiency and resource utilization in the distributed computing environment.

12 Claims, 15 Drawing Sheets

(51) Int. Cl.
*H04L 29/08* (2006.01)
*H04L 12/24* (2006.01)

(58) Field of Classification Search
USPC .................................................. 709/223, 226
See application file for complete search history.

(56) References Cited

U.S. PATENT DOCUMENTS

| | | | |
|---|---|---|---|
| 8,286,174 | B1 | 10/2012 | Schmidt et al. |
| 8,396,730 | B2 | 3/2013 | Khosla et al. |
| 8,548,790 | B2 | 10/2013 | Tylutki |
| 8,756,610 | B2 | 6/2014 | Dasgupta et al. |
| 8,966,030 | B1 | 2/2015 | Sirota et al. |
| 9,055,067 | B1 | 6/2015 | Ward et al. |
| 9,069,606 | B2 | 6/2015 | Donahue |
| 9,246,840 | B2 | 1/2016 | Anderson et al. |
| 9,329,904 | B2 | 5/2016 | Wray et al. |
| 9,442,954 | B2 | 9/2016 | Guha et al. |
| 9,503,310 | B1 | 11/2016 | Hawkes |
| 9,547,534 | B2 | 1/2017 | Dettori et al. |
| 9,804,890 | B1 | 10/2017 | Pai et al. |
| 9,858,123 | B1 | 1/2018 | Dialianas et al. |
| 10,191,778 | B1 | 1/2019 | Yang et al. |
| 10,346,775 | B1 | 7/2019 | Xu et al. |
| 2004/0210871 | A1 | 10/2004 | Hasegawa et al. |
| 2005/0066052 | A1 | 3/2005 | Gupta et al. |
| 2005/0135575 | A1 | 6/2005 | Haskey et al. |
| 2005/0246716 | A1 | 11/2005 | Smith et al. |
| 2006/0045039 | A1 | 3/2006 | Tsuneya et al. |
| 2006/0140115 | A1* | 6/2006 | Timus .............. H04L 47/10 370/230 |
| 2008/0244600 | A1 | 10/2008 | Wong et al. |
| 2008/0313639 | A1 | 12/2008 | Kumar et al. |
| 2009/0119673 | A1 | 5/2009 | Bubba |
| 2009/0204693 | A1 | 8/2009 | Andreev et al. |
| 2010/0088150 | A1 | 4/2010 | Mazhar et al. |
| 2012/0130873 | A1 | 5/2012 | Morgan |
| 2012/0167083 | A1 | 6/2012 | Suit |
| 2012/0173709 | A1 | 7/2012 | Li et al. |
| 2012/0185913 | A1 | 7/2012 | Martinez et al. |
| 2012/0272237 | A1* | 10/2012 | Baron .............. G06F 9/45558 718/1 |
| 2013/0021933 | A1 | 1/2013 | Kovvali et al. |
| 2013/0080641 | A1 | 3/2013 | Lui et al. |
| 2013/0086273 | A1 | 4/2013 | Wray et al. |
| 2013/0174149 | A1 | 7/2013 | Dasgupta et al. |
| 2013/0185729 | A1 | 7/2013 | Vasic et al. |
| 2013/0262680 | A1 | 10/2013 | Gujarathi et al. |
| 2013/0326058 | A1 | 12/2013 | Brady et al. |
| 2014/0040343 | A1 | 2/2014 | Nickolov et al. |
| 2014/0052768 | A1 | 2/2014 | Deng et al. |
| 2014/0122695 | A1* | 5/2014 | Kulikov .............. H04L 43/00 709/224 |
| 2014/0157281 | A1 | 6/2014 | Pike |
| 2014/0164477 | A1 | 6/2014 | Springer et al. |
| 2014/0195673 | A1 | 7/2014 | Cook et al. |
| 2014/0325070 | A1 | 10/2014 | Philip et al. |
| 2015/0113120 | A1 | 4/2015 | Jacobson et al. |
| 2015/0135160 | A1 | 5/2015 | Gauvin et al. |
| 2015/0169339 | A1 | 6/2015 | Anderson et al. |
| 2015/0172205 | A1 | 6/2015 | Anderson et al. |
| 2015/0207752 | A1 | 7/2015 | Birkestrand |
| 2015/0304176 | A1 | 10/2015 | Ting et al. |
| 2015/0356097 | A1 | 12/2015 | Chopra et al. |
| 2016/0164738 | A1 | 6/2016 | Pinski et al. |
| 2016/0164762 | A1* | 6/2016 | Reque .............. H04L 47/808 718/1 |
| 2016/0323377 | A1 | 11/2016 | Einkauf et al. |
| 2016/0328259 | A1 | 11/2016 | Xia et al. |
| 2016/0378552 | A1 | 12/2016 | Taylor et al. |
| 2017/0011299 | A1 | 1/2017 | Ebert et al. |
| 2017/0019475 | A1 | 1/2017 | Metz et al. |
| 2017/0053129 | A1 | 2/2017 | Arif et al. |
| 2017/0163487 | A1 | 6/2017 | Wang et al. |
| 2017/0199770 | A1 | 7/2017 | Peteva et al. |
| 2017/0331705 | A1 | 11/2017 | Jiang et al. |
| 2017/0357531 | A1 | 12/2017 | Zhang et al. |
| 2018/0095778 | A1 | 4/2018 | Aydelott et al. |
| 2018/0102981 | A1 | 4/2018 | Kurtzman et al. |
| 2018/0121491 | A1 | 5/2018 | Ivanov |
| 2018/0130171 | A1 | 5/2018 | Prakash et al. |
| 2018/0175977 | A1 | 6/2018 | Song et al. |
| 2018/0197233 | A1 | 7/2018 | Ghit et al. |
| 2018/0241642 | A1 | 8/2018 | Patel et al. |
| 2018/0241643 | A1 | 8/2018 | Chaganti et al. |
| 2018/0300116 | A1 | 10/2018 | Meytin et al. |
| 2018/0302340 | A1 | 10/2018 | Avlarez Callau et al. |
| 2018/0359162 | A1 | 12/2018 | Savov et al. |
| 2018/0365075 | A1 | 12/2018 | Fang |
| 2018/0367434 | A1 | 12/2018 | Kushmerick et al. |
| 2019/0220298 | A1 | 7/2019 | Jiao et al. |

FOREIGN PATENT DOCUMENTS

| | | |
|---|---|---|
| CN | 103559072 A | 2/2014 |
| CN | 104142860 A | 11/2014 |
| CN | 106168910 A | 11/2016 |
| CN | 107247778 A | 10/2017 |
| KR | 1020100060507 A | 6/2010 |

OTHER PUBLICATIONS

Dutta et al., "SmartScale: Automatic Application Scaling in Enterprise Clouds," 2012 IEEE Fifth International Conference on Cloud Computing, Jun. 24-29, 2012 (8 pages).

Lu et al., "Application-Driven Dynamic Vertical Scaling of Virtual Machines in Resource Pools," Network Operations and Management Symposium (NOMS), IEEE, May 5-9, 2014 (9 pages).

Spinner et al., "Runtime Vertical Scaling of Virtualized Applications via Online Model Estimation," 2014 IEEE Eighth International Conference on Self-Adaptive and Self-Organizing Systems, 2014 (10 pages).

Vasic et al., "DejaVu: Accelerating Resource Allocation in Virtualized Environments," 2012 ACM, ASPLOS XVII Proceedings of the Seventeenth International Conference on Architectural Support for Programming Languages and Operating Systems, Mar. 3-7, 2012 (13 pages).

Yazdanov et al., "Vertical Scaling for Prioritized VMs Provisioning," 2012 Second International Conference on Cloud and Green Computing, 2012 (8 pages).

Lorido-Botran et al., "Auto-scaling Techniques for Elastic Applications in Cloud Environments," Technical Report EHU-KAT-IK-09-12, Sep. 5, 2012 (44 pages).

Yazdanov et al., "Scaler: Autonomic Virtual Machine Scaling," 2013 IEEE Sixth International Conference on Cloud Computing, 2013 (8 pages).

Sahu et al., "A Cost Effective Scaling Approach for Cloud Applications," International Journal of Advanced Research in Computer Engineering & Technology (IJARCET), vol. 1, Issue 9, Nov. 2012 (5 pages).

Laubis et al., "Cloud adoption by fine-grained resource adaptation: Price determination of diagonally scalable IaaS," http://publikationen.bibliothek.kit.edu/1000056386, Apr. 27, 2016 (2 pages).

Das et al., "Automated Demand-driven Resource Scaling in Relational Database-as-a-Service," SIGMOD'16, Jun. 26-Jul. 1, 2016 (12 pages).

Niikravesh et al., "Cloud Resource Autoscaling System based on Hidden Markov Model (HMM)," 2014 IEEE International Conference on Semantic Computing, Jun. 16-18, 2014 (4 pages).

Sidhanta et al., "Infra: SLO Aware Elastic Auto Scaling in the Cloud for Cost Reduction," 2016 IEEE International Congress on Big Data, Jun. 27-Jul. 2, 2016 (8 pages).

Bird, "Optimizing Resource Allocation for Dynamic Interactive Applications," UC Berkeley Electronic Theses and Dissertations, 2014 (122 pages).

Gandhi et al., "Modeling the Impact of Workload on Cloud Resource Scaling," https://www3.cs.stonybrook.edu/~anshul/sbac14.pdf, 2014 (8 pages).

(56) References Cited

OTHER PUBLICATIONS

Nisar et al., "Hybrid Auto-scaling of Multi-tier Web Applications: A Case of Using Amazon Public Cloud," https://www.researchgate.net/publication/283635648_Hybrid_Auto-scaling_of_Multi-tier_Web_Applications_A_Case_of_Using_Amazon_Public_Cloud, Jan. 2015 (6 pages).

Wang W, Chen H, Chen X. An availability-aware virtual machine placement approach for dynamic scaling of cloud applications. In 2012 9th International Conference on Ubiquitous Intelligence and Computing and 9th International Conference on Autonomic and Trusted Computing 2012. Sep. 4, 2012 (pp. 509-516).

Vaquero LM, Rodero-Merino L, Buyya R. Dynamically scaling application in the cloud. ACM SIGCOMM Computer Communication Review. Jan. 22, 2011; 41(1): 45-52 (Year 2011).

Batista BG, Estrella JC, Ferreira CH, Leite Filho DM, Nakamura LH, Reiff-Marganiec S, Santana MJ, Santana RH. Performance evaluation of resource management in cloud computing environments. PLoS one. Nov. 10, 2015; 10(11):e0141914. (Year 2015).

Khatua S, Ghosh A, Mukherjee N. Optimizing the utilization of virtual resources in cloud environment. In 2010 IEEE ntemational Conference on Virtual Environments, Human-Computer Interfaces and Measurement Systems Sep. 6, 2010 (pp. 82-87) IEEE (Year 2010).

List of IBM Patents or Patent Applications Treated as Related dated Nov. 27, 2017 (2 pages).

Nang W, Chen H, Chen X. "An availability-aware virtual machine placement approach for dynamic scaling of cloud application". In2012 9th International Conf on Ubiquitous Intelligence and Computing and 9th International Conference on Autonomic and Trusted Computing Sep. 4, 2012 (pp. 509-516). IEEE. Year: 2012.

Vaquero LM, Rodero-Merino L, Buyya R. "Dynamically scaling applications in the cloud". ACM SIGCOMM Computer Communication Review. Jan. 22, 2011;41(1):45-52 Year: 2017 (8 Pages).

Batista BG, Estrella JC, Ferreira CH, Leite Filho DM, Nakamura LH, Reiff-Marganiec S, Santana MJ, Santana RH. "Performance evaluation of resource management in cloud computing environments". PloS one. Nov. 10, 2015;10(11): e0141914 Year: 2015 (21 Pages).

Khatua S, Ghosh A, Mukherjee N. "Optimizing the utilization of virtual resources in cloud environment" In 2010 IEEE International Conference of Virtual Environments, Human-Computer Interfaces and Measurement Systems Sep. 6, 2010: (pp. 82-87). IEEE (Year: 2010).

* cited by examiner

ADAPTIVE RESOURCE ALLOCATION OPERATIONS BASED ON HISTORICAL DATA IN A DISTRIBUTED COMPUTING ENVIRONMENT

CROSS-REFERENCE TO RELATED APPLICATIONS

This Application is related to the following five Applications having U.S. application Ser. Nos. 15/819,225; 15/819,251; 15/819,266; 15/819,276; and 15/819,291, each filed on even date as the present Application.

BACKGROUND OF THE INVENTION

Field of the Invention

The present invention relates in general to computing systems, and more particularly to, various embodiments for optimizing resource usage within and/or between distributed computing components.

Description of the Related Art

In today's society, computer systems are commonplace. Computer systems may be found in the workplace, at home, or at school. As computer systems become increasingly relied upon, convenient and portable, the Internet, and the dependency thereon, has grown exponentially. Now, more than ever before, individuals and businesses rely upon distributed computing systems (commonly referred to as "the cloud") to process workloads and store information and data. As wide strides in technological advancement relating to workload processing, resource allocation and data access have been accomplished, there is an ever-growing demand for growth and development within the back-end supporting systems that provide these functions.

SUMMARY OF THE INVENTION

Various embodiments are disclosed herein to adaptively compute and implement changes in resource allocation using historical data commensurate with diagonal scaling techniques of applications and resources in a distributed computing environment, which will be further described. In one embodiment, by way of example only, historical data on resource consumption levels of an application is maintained. Either of an increase operation or reduction operation is triggered for a resource required by an application instance of the application, where a predicted consumption level for the resource required by the application instance is computed. The increase or reduction operation is computed and implemented for the resource required by the application instance to accommodate the predicted consumption level, thereby optimizing application efficiency and resource utilization in the distributed computing environment.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
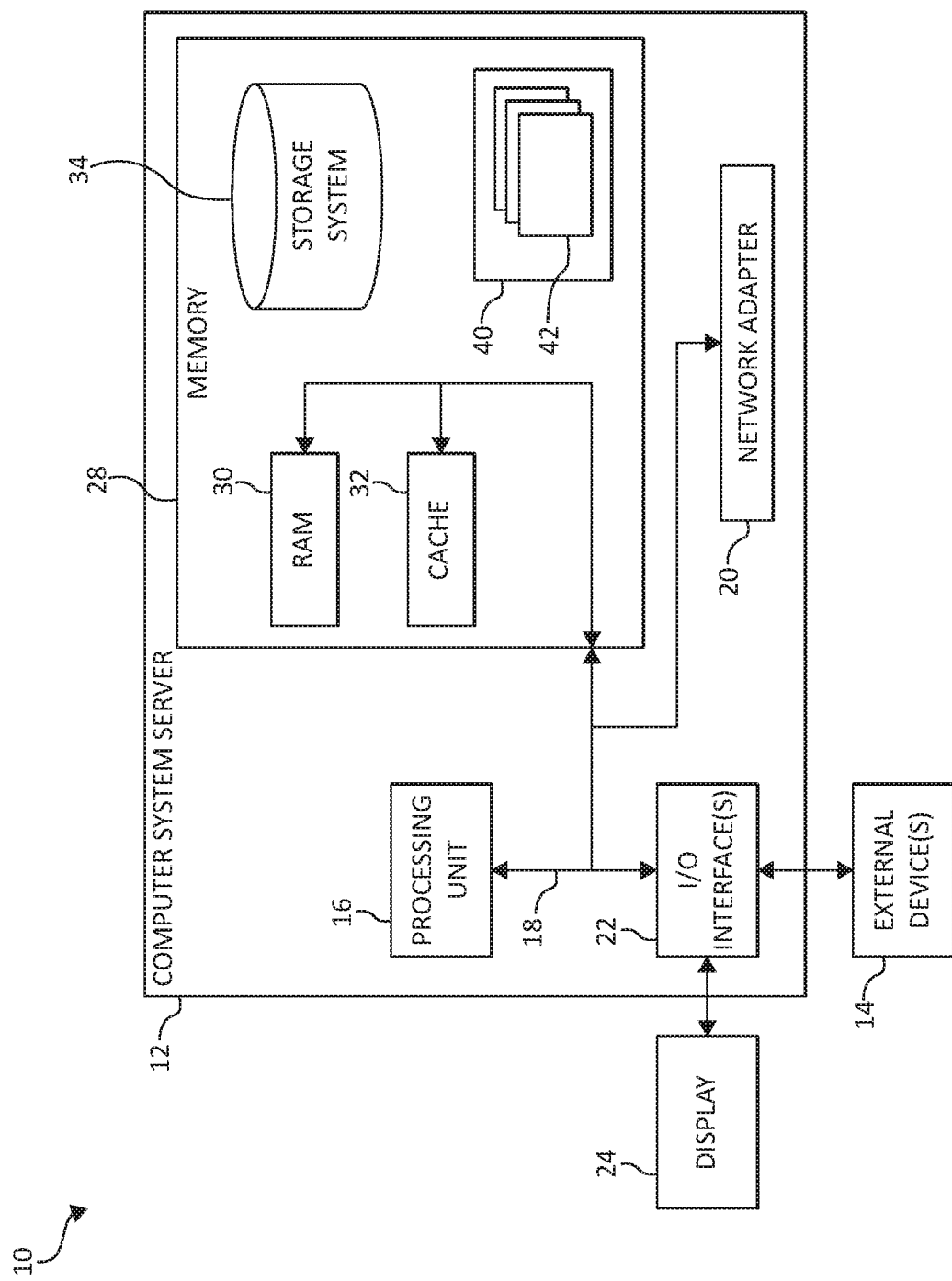
FIG. 1 is a block diagram depicting an exemplary computing node according to an embodiment of the present invention.

A computer cluster, referred to as cluster for short, is a type of computer system which completes computing jobs by means of multiple collaborative computers (also known as computing resources such as software and/or hardware resources) which are connected together. These computing resources which are in a same management domain have a unified management policy and provide services to users as a whole. A single computer in a cluster system is usually called a node or a computing node.

Computing clusters often implement various techniques to optimize resources used to execute workloads performed therein as provided by users. One common technique generally employed is the use of scaling resources and/or applications. Diagonal scaling is a recent approach that applies a combination of vertical scaling and horizontal scaling to fit the resource requirements of each application. Vertical scaling refers to the addition and reduction of resources for a particular running application instance. Horizontal scaling refers to the creation and removal of application instances. In other words, vertical scaling may be employed to allocate or de-allocate certain resources of the computing cluster (e.g., memory, central processing units (CPUs), storage capacity, etc.) to an application, or rather one of many running instances of the application, and horizontal scaling may be employed to add or remove one or more of the application instances of the same application. Diagonal scaling combines both of these techniques to ensure that computing cluster resources are appropriated and utilized efficiently, to automatically accommodate dynamic changes in the resource requirements of applications.

Existing technologies tend to focus on horizontal scaling, namely adding and removing application instances. The embodiments described herein feature mechanisms for both vertical scaling (adding and removing resources for an application instance) and horizontal scaling (adding and removing application instances). In addition, the present invention provides a unified algorithmic mechanism that automatically applies both vertical and horizontal scaling, creating a synergy between vertical and horizontal scaling (i.e., diagonal scaling), to optimize the efficiency of applications and platforms.

Many existing technologies target virtual machines or containers and require use of their specific properties and capabilities (e.g., for measuring usage and defining resource requirements) to implement application or resource scaling, and some existing technologies require users to predefine a target for the utilization level of a resource (e.g., CPU) to facilitate scaling operations. The arbitrary nature of such targets, and the fact that these targets refer to infrastructure resources rather than higher level quality of service aspects of applications, can make the behavior of such scaling mechanisms less aligned with actual requirements for quality of service of applications. The mechanisms presented herein do not use such pre-defined targets, and instead align the provided resources to the actual load of applications by considering applications' priorities and quality of service aspects. Further, the mechanisms of the present invention provide generic methods for implementing diagonal scaling, without relying on the form in which an application runs.

Traditionally, existing technologies consider each resource on its own and each application on its own, separated from other applications, in determining scaling operations. Using the functionality of the mechanisms described herein, the measurements of all relevant resources and the collective formation and priorities of the applications are considered in determining scaling operations.

Finally, some of the existing technologies require and depend on the availability of other technologies (e.g., technologies for collecting usage metrics) for implementing scaling operations, and other existing technologies work with aggregated metrics for scaling purposes, without separation as to specific metrics. The present invention does not necessitate or depend on other technologies. Furthermore, in the present invention, measurements of all relevant metrics are applied individually, and scaling operations are then determined based on a collective view of metrics and applications.

In view of the existing methods known and to improve upon the art, the new algorithms and methods considered in this disclosure provide comprehensive and efficient functionality for automatic diagonal scaling by integrating vertical scaling and horizontal scaling in a unified automatic mechanism to optimize the efficiency of applications and resource platforms.

The present invention employs functionality to more efficiently optimize and utilize resources in distributed computing environments by way of automatic diagonal scaling. That is, the disclosed embodiments employ efficient mechanisms for automatic diagonal scaling, having the following exemplary specifications. First, actual resource consumption of application instances is automatically tracked and compared to allocated resources of the application instances. Second, the allocated resources and the resource limits thereof are automatically tuned (increased/decreased) according to the compared consumption to allocation of these resources. More particularly, when an application's workload grows, the mechanisms described herein make additional resources available to the application. Similarly, when the workload is reduced, the resources are decreased. Third, vertical and horizontal scaling are used automatically, according to application instance and/or host status and policies. Fourth and lastly, the functionality herein is customizable, efficient, and easy to configure. For example, items that can be set by users may include: maximum bounds on consumption of different resources (e.g., based on historical statistics and cost constraints); minimal bounds on availability of different resources; triggers for determining that a scaling operation is required; and policies for integrating the vertical and horizontal scaling.

According to these specifications, the proposed mechanisms provide the following benefits. First, throughput of the applications is optimized, according to actual workloads that are provided as input to the applications, priorities of the applications, and available resources. Second, a cost of resources allocated to applications is minimized, and cluster resource utilization is improved. Thus, because of the more efficient utilization of cluster resources, the cluster is able to accommodate additional workloads while reducing the cost of running such workloads. Third, customers utilizing the cluster pay only for resources actually required or used to perform their respective workloads such that overpayment for unused resources is avoided. In addition, cloud flexibility and its monetary charging mechanisms are improved. Fourth, application efficiency is improved and additionally the configuration thereof by removing a requirement to estimate resource allocation and scalability and manually tune the same according to workloads. Fifth and finally, the mechanisms herein use generic automatic diagonal scaling functionality that can be added or implemented to a variety of workload management systems.

It should be noted that the instant disclosure, for brevity, frequents the language of "resources". In an actual implementation of the present invention, the resources termed herein may be comprised of CPUs, graphical processing units (GPUs), memory, storage devices, network devices, accelerator devices, or even entire computing nodes. Indeed, any hardware and/or software resources as commonly known in the art are to be construed interchangeably with "resources" or "resource types" as described herein, as one practicing the art would appreciate. Additionally, the disclosure describes "application instances" of applications. As one of ordinary skill in the art would recognize, application instances are meant to refer to individual occurrences of a particular executing or running application of the same, although the nature of the application or application instances thereof may vary widely according to the particular implementation of the functionality disclosed herein.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be used in processing distributed workloads using the diagonal scaling functionality taught herein. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
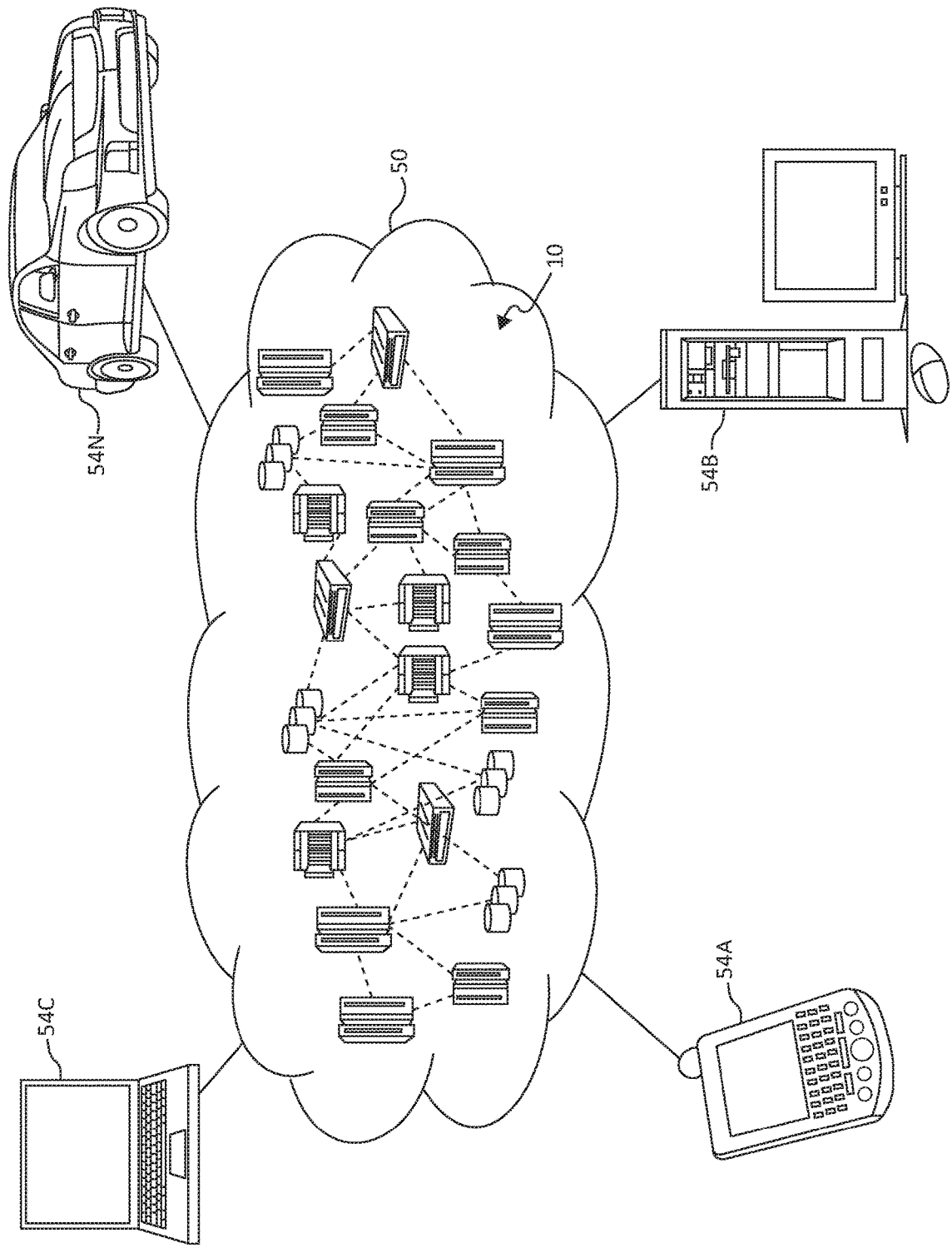
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
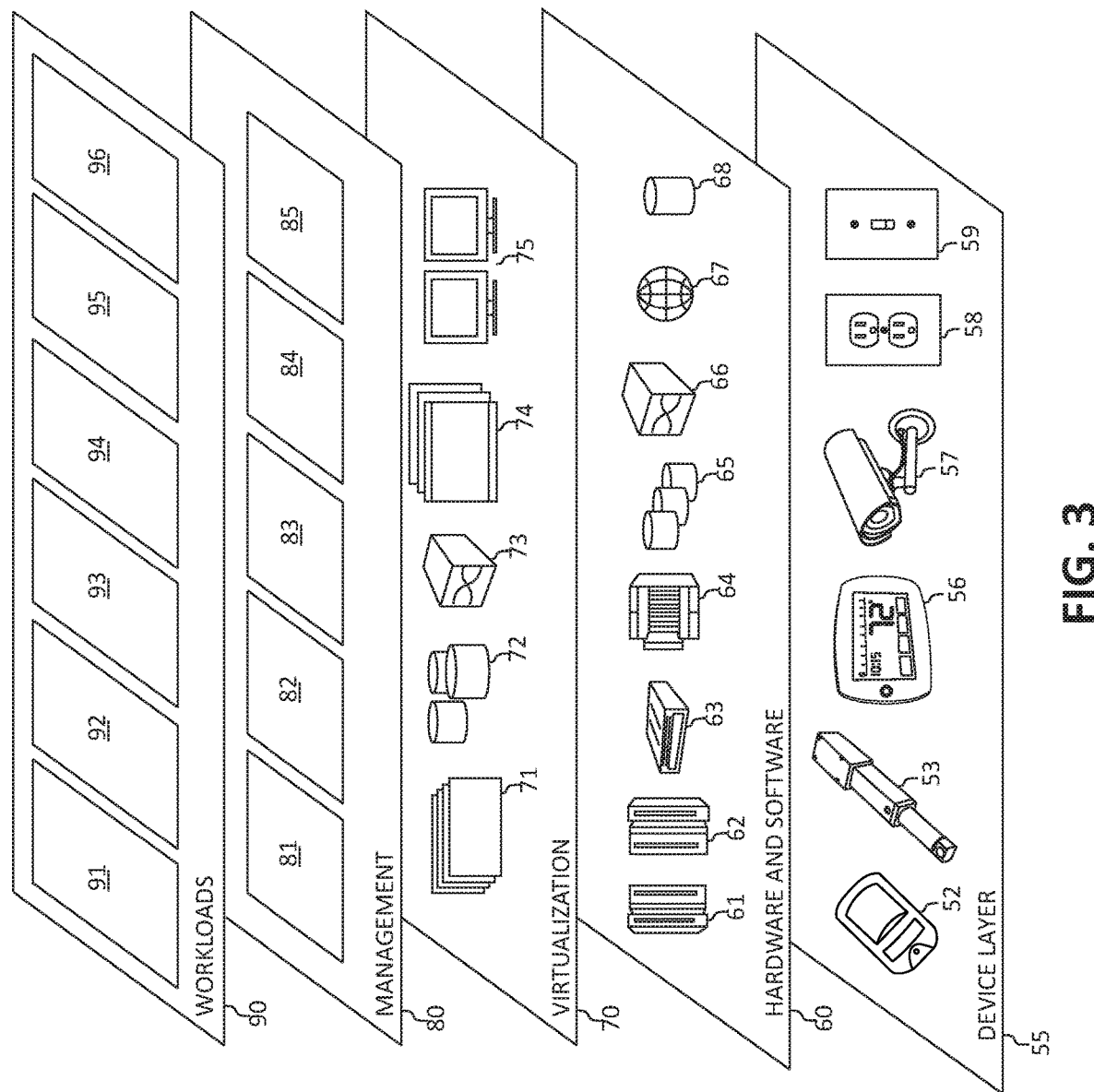
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various resource and application scaling functions 96. In addition, resource and application scaling functions 96 may include such operations as analyzing certain data to allocate or de-allocate resources to certain workloads and/or create or remove application instances of the certain workloads, as will be further described. One of ordinary skill in the art will appreciate that the resource and application scaling functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
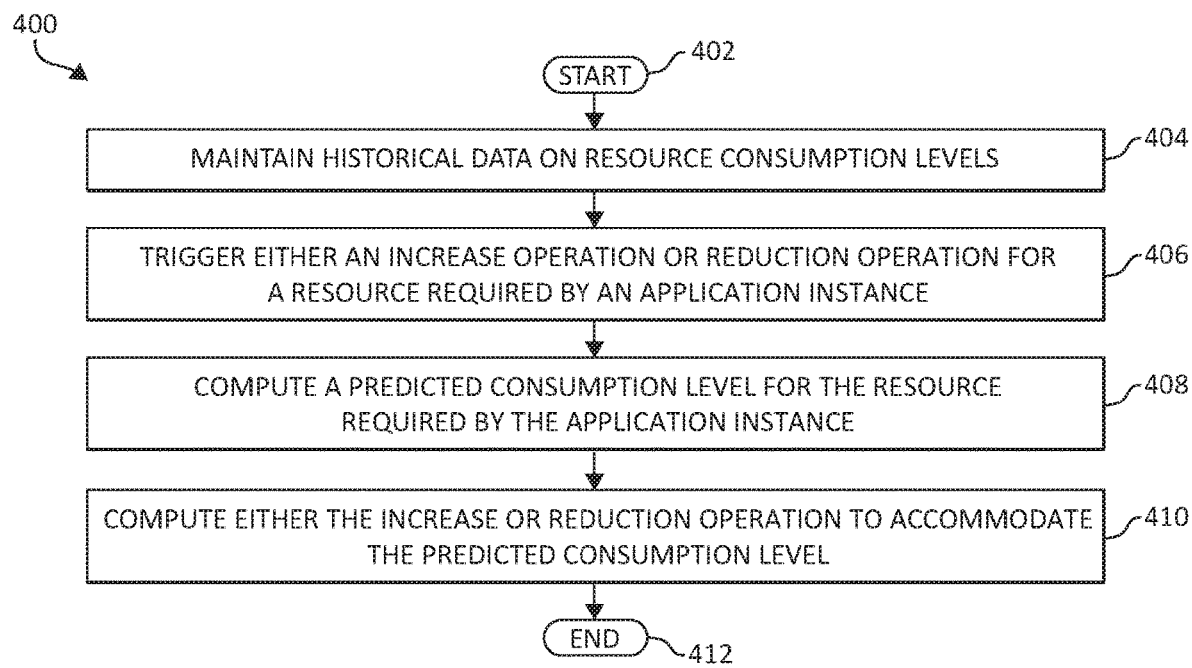
FIG. 4 illustrates a flowchart diagram depicting a method for adaptive computation of a change in resource allocation using historical data in a distributed computing environment, in accordance with aspects of the present invention.

Continuing, FIG. 4 illustrates an exemplary method 400 for adaptive computation (and implementation) of a change in resource allocation using historical data in a distributed computing environment, in accordance with one embodiment of the present invention. The method 400 (and the additional methods discussed hereinafter) may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 (and the additional methods discussed hereinafter) may be performed by any suitable component of the operating environment. For example, in various embodiments, the method 400 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a CPU, an application specific integrated circuit (ASIC), a field programmable gate array (FPGA), etc., combinations thereof, or any other suitable computing device known in the art.

The method 400 begins (step 402) by maintaining historical data on resource consumption levels of an application (step 404). That is, for each application and application instance, historical records (of which may comprise a predetermined time period of history) are kept and maintained for each specific resource used by the application/application instance. Either an increase operation or reduction operation (allocation or reduction) for a particular consumed resource required by an application instance of the application is triggered (step 406), and a predicted consumption level for the particular resource required by the application instance is computed (step 408). Either the increase or reduction operation of the resource required by the application instance is then subsequently computed and implemented to accommodate the predicted consumption level, thereby optimizing application efficiency and resource utilization in the distributed computing environment (step 410). The method 400 ends (step 412).

Figure 5:
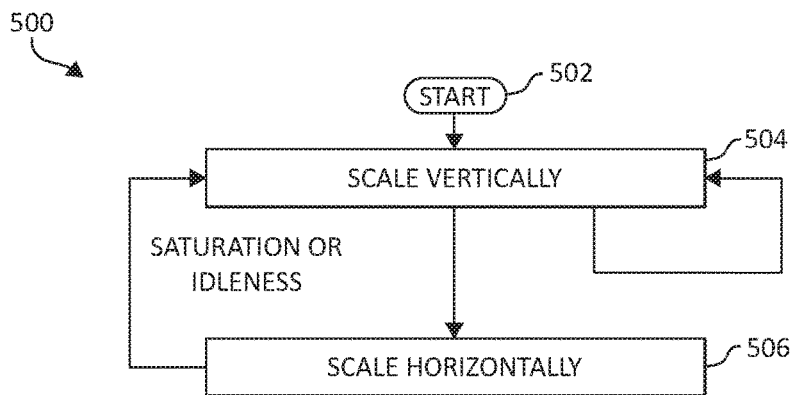
FIG. 5 illustrates a combination block/flowchart diagram depicting a diagonal scaling model, in accordance with aspects of the present invention.

The general approach of diagonal scaling is to scale application instances vertically (allocating or de-allocating resources), and when an application instance or a host are saturated, or when an application instance is idle, to then scale horizontally (create or remove application instances). Subsequent to scaling horizontally, continue to scale application instances vertically. This implementation is described in FIG. 5, which illustrates a combination block/flowchart diagram depicting a diagonal scaling model 500.

The method 500 begins (step 502) with applying vertical scaling operations for an application instance (step 504). That is, resources are either allocated or de-allocated to/from the application instance to satisfy the resource requirements necessitated by the application instance. When the application instance is either saturated (fully utilized) or idle, or when a host is saturated, the method 500 may apply horizontal scaling operations for the application instance (step 506). To wit, upon performing the vertical scaling of allocating or de-allocating resources in step 504, and determining that the application instance is still either fully saturated or idle, the application instance is then horizontally scaled by either adding or removing application instances thereof. Following the horizontal scaling operations (step 506), the method returns to applying (and continuing to apply thereinafter) vertical scaling operations if necessary (step 504).

Figure 6:
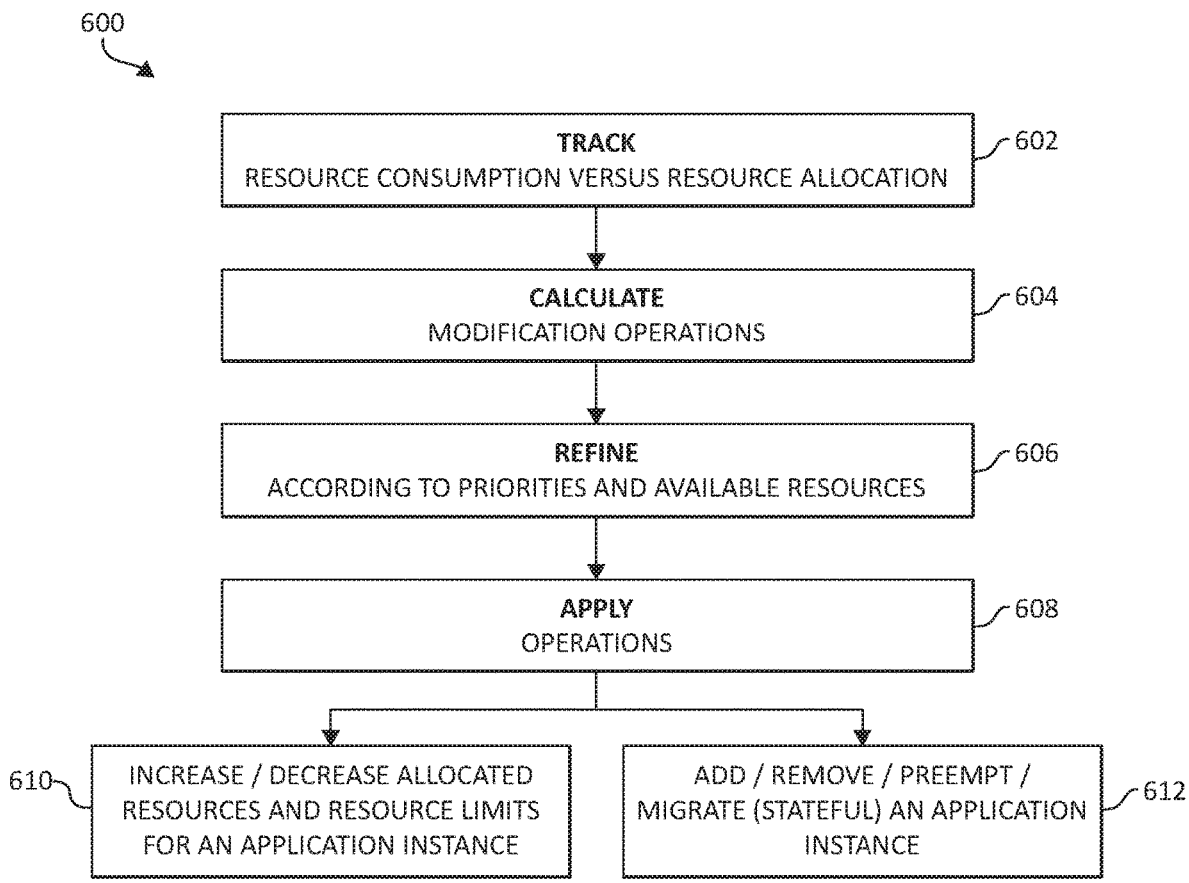
FIG. 6 illustrates an additional flowchart diagram depicting a method for automatic diagonal scaling of workloads in a distributed computing environment, in accordance with aspects of the present invention.

FIG. 6 illustrates an additional flowchart diagram depicting a method 600 for automatic diagonal scaling of workloads in a distributed computing environment, in accordance with aspects of the present invention. The method 600 begins by automatically tracking the resource consumption of each of one or more application instances and compares the consumption of each of the application instances to the resource allocation of the application instance (step 602). The method 600 then continues by computing modification operations (increases or decreases) of resource allocations to the application instances (step 604), in accordance with the results of the comparison in step 602. Next, the computed modification operations are refined according to priorities of the applications and/or application instances, and available resources (step 606). The computed modification operations are then dynamically applied to the application instances respectively (step 608), where the modification operations are of various types, illustrated in steps 610 and 612.

One type of operation which may be applied comprises increasing or decreasing the amount of allocated resources and resource limits allocated to a particular application instance (step 610). In this way, when an application's load grows, additional resources are made available to the particular application instance. Similarly, when the load of the particular application instance is reduced, the excess resources unneeded or unused by the application instance are de-allocated from the particular application instance. Returning to step 608, another type of modification operation that may be applied comprises adding, removing, pre-empting, or migrating application instances (step 612). For example, if an application instance is stateless, the stateless application instance may be easily removed or preempted. Conversely, if an application instance is stateful, the application instance may be better suited to be migrated to alternative resources in the computing cluster. The handling of stateful applications and the dependencies thereof will be discussed further, below.

Identifying Requirements for Changes in Resource Allocations

Figure 7A:
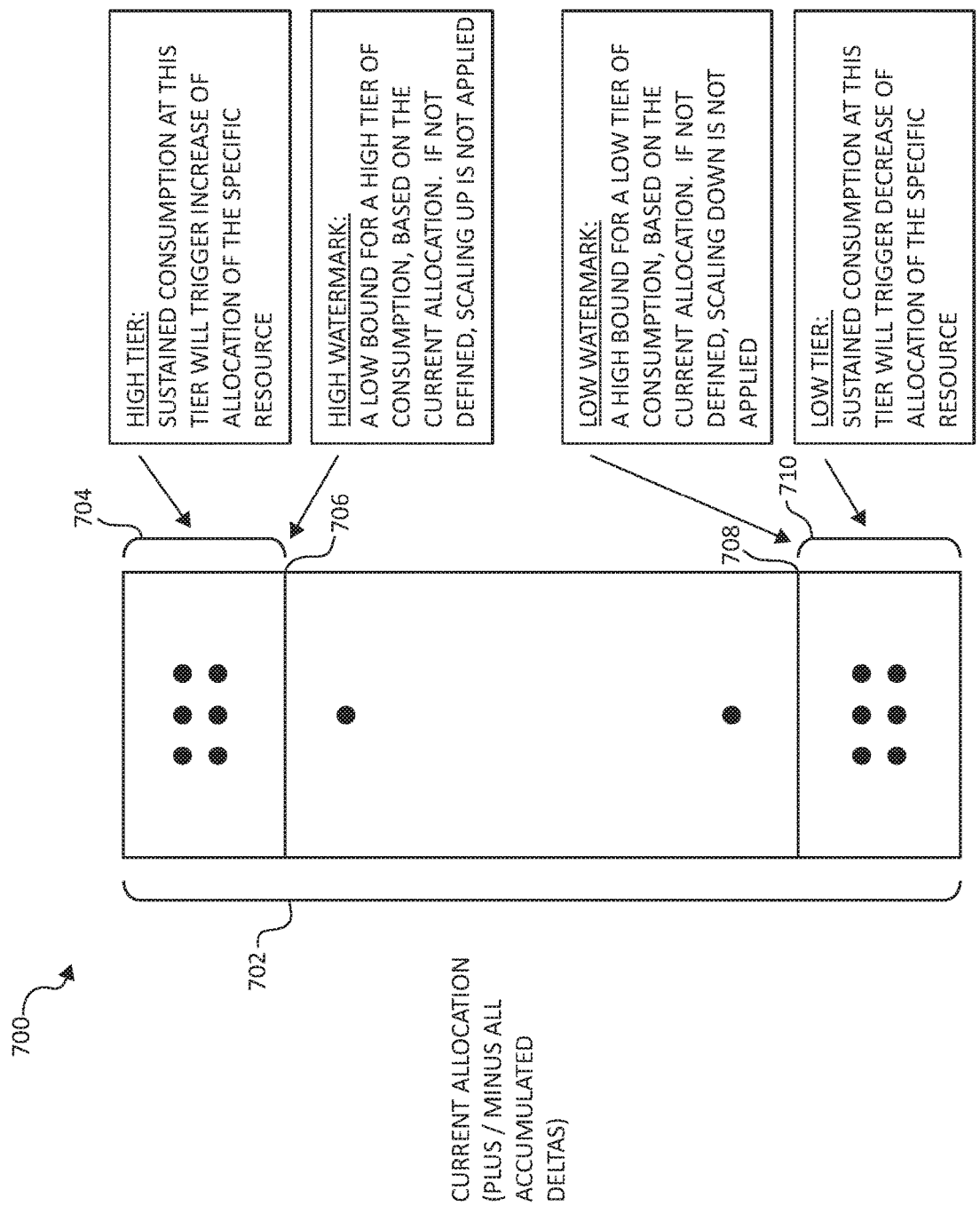
FIG. 7A illustrates a block diagram depicting an exemplary computation mechanism for each of a plurality of resource types, in accordance with aspects of the present invention.

FIG. 7A illustrates a block diagram depicting an exemplary computation mechanism 700 for each of a plurality of resource types, in accordance with aspects of the present invention. The full bar represents the current allocation 702 (plus/minus all accumulated deltas) of a specific resource for a specific application instance. Two watermarks depicted of the computation mechanism 700 define two tiers of consumption, relative to the current allocation. A high watermark 706 defines a low bound for a high tier 704 of consumption. If the high watermark 706 is not defined for a specific resource, the scale up mechanism (vertical scaling of allocating resources) is not activated for that resource.

Similarly, a low watermark 708 defines a high bound for a low tier 710 of consumption. If the low watermark 708 is not defined for a specific resource, the scale down mechanism (vertical scaling of de-allocating resources) is not activated for that resource. Sustained consumption at the high tier 704 will trigger an increase of allocation of the specific resource for the specific application instance, and again similarly, sustained consumption at the low tier 710 will trigger a decrease of allocation of the specific resource for the specific application instance.

To define sustained consumption, a time period for qualifying for an allocation change is prescribed. This time period is a time window having a sufficient number of samples remain at sustained consumption within a tier (high tier 704 or low tier 710) to qualify for an allocation change. The time period may be a sliding window over time, and may have a default value. Further defined are a percentage of outlying samples as follows. Sustained consumption is defined, based on these definitions, as having no more than the outlying percentage of the samples outside of either the high tier 704 or the low tier 710 for the duration of the defined time window. For example, assuming a time window of 1 hour and outlying percentage of 10%, if at least 90% of the samples are in one of the tier areas in the last hour, an appropriate increase/decrease action will be computed for the relevant resource.

Increase in Resource Allocation Handling

Figure 7B:
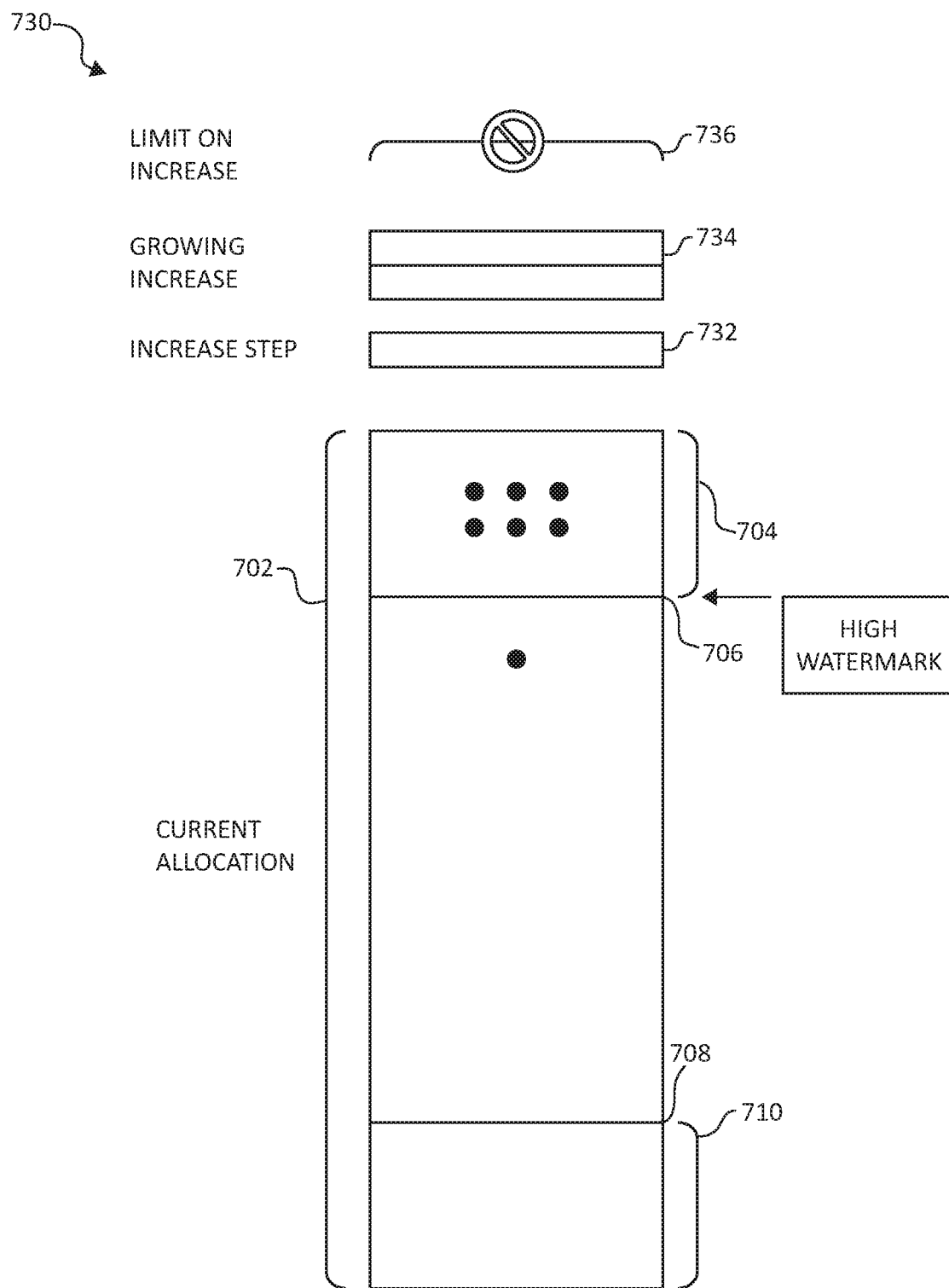
FIG. 7B illustrates an additional block diagram depicting an exemplary computation mechanism for each of the plurality of resource types, in accordance with aspects of the present invention.

FIG. 7B illustrates an additional block diagram depicting an exemplary computation mechanism 730 for each of the plurality of resource types, in accordance with aspects of the present invention. Specifically, computation mechanism 730 illustrates a case of identified sustained consumption at the high tier 704.

Again, the full bar represents the current allocation 702 of a specific resource for a specific application instance. The high tier 704 is shown to include all the samples minus no more than the outlying percentage, in the inspected time window, therefore generating an increase operation for the specific resource and the specific application instance. The increase operation (the additional allocation of the specific resource to the specific application instance) may be performed with a fixed increment, or with growing increments, or with adaptive increments, as specified next.

An increase step 732 is defined to be an absolute value or percentage of the current allocation 702. Further defined is an increase function type, that may be configured with the following possible values: 1) one step (default), where the allocation will be increased with one step (e.g., increase step 732); 2) growing increase (e.g., growing increase 734), which is applied if the increase operations are subsequent to each other; or 3) automatic and adaptive increase, which is based on historical data, as specified in the following.

A time period without an increase operation resets the growing increase 734 functionality. Various functions of the growing increase 734 may be configured, for example, an increase value in a previous increase operation+1 step may be performed (e.g., where the values follow a pattern of 1 step, 2 steps, 3 steps, 4 steps, 5 steps, etc.). In another example, an increase value in a previous increase operation+a linearly growing step may be performed (e.g., where the values follow a pattern of 1 step, 3 steps, 6 steps, 10 steps, 15 steps, 21 steps, etc.).

In still another example, an increase value in a previous operation×2 steps may be performed (e.g., where the values follow a pattern of 1 step, 2 steps, 4 steps, 8 steps, 16 steps, 32 steps, etc.). A limit on increase 736 is further defined to enable the user to control the maximal consumption and associated costs. In some embodiments, there may be multiple limits on increase that are mapped to different time periods (e.g., of day), which may be useful if the cost of resources varies depending on the time the resources are allocated and/or used. Increase operations computed for a resource and an application instance will not exceed the defined value (or values) of the limit on increase 736 for that resource and application instance. Each pair of resource and application is further associated with an indication, which may be named as a critical resource for increase indication. If this critical resource for increase indication is set to be true, and the limit on increase 736 for the resource and application instance has already been reached while still attaining high tier 704 consumption, then an appropriate action will be taken, where the action is defined for the entire application instance and may include horizontal scaling of the application instance (e.g., addition of application instances).

Reduction in Resource Allocation Handling

Figure 7C:
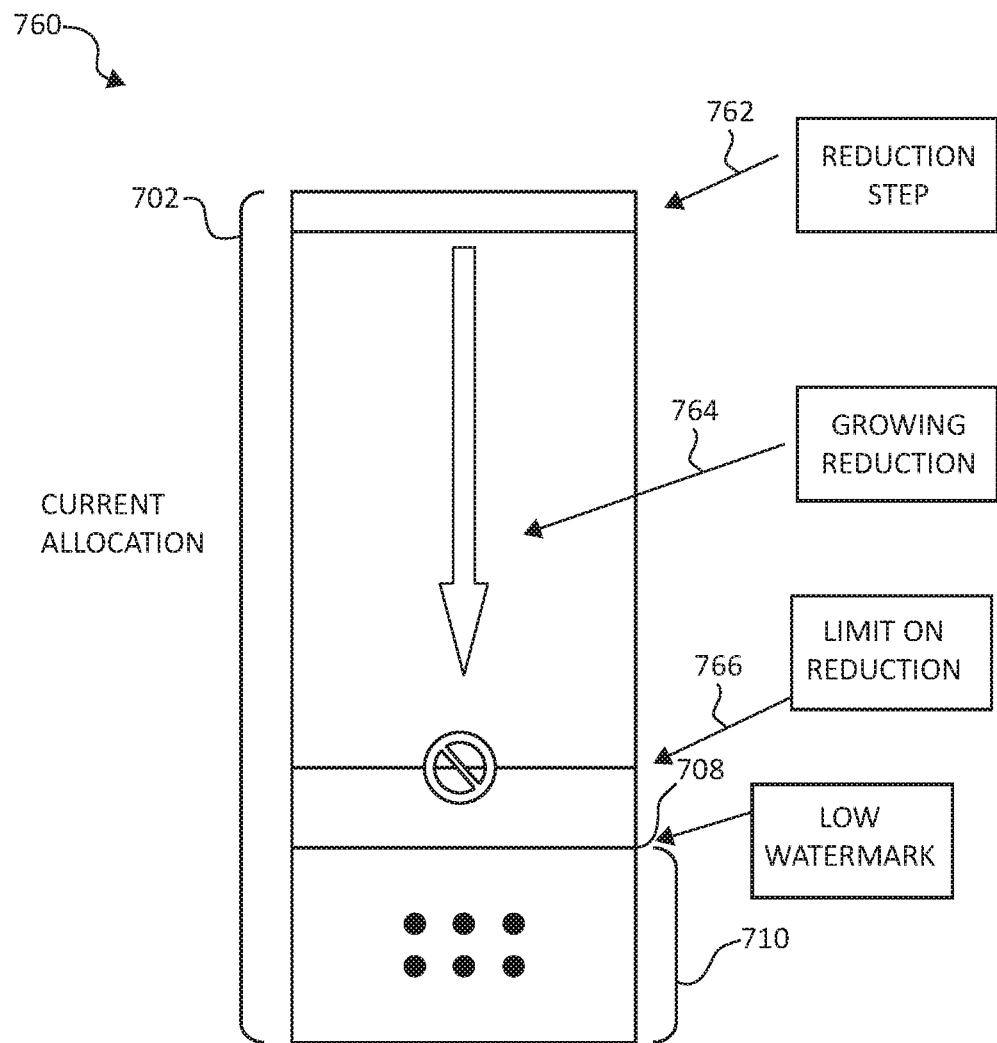
FIG. 7C illustrates still an additional block diagram depicting an exemplary computation mechanism for each of the plurality of resource types, in accordance with aspects of the present invention.

FIG. 7C illustrates an additional block diagram depicting an exemplary computation mechanism 760 for each of the plurality of resource types, in accordance with aspects of the present invention. Specifically, computation mechanism 760 illustrates a case of identified sustained consumption at the low tier 710.

Still again, the full bar represents the current allocation 702 of a specific resource for a specific application instance. The low tier 710 is shown to include all the samples minus no more than the outlying percentage, in the inspected time window, therefore generating a reduction operation for the specific resource and the specific application instance. The reduction operation (the de-allocation of the specific resource from the specific application instance) may be performed, with a fixed decrement, or with a maximal decrement, or with growing decrements, or with adaptive decrements, as specified next.

A reduction step 762 is defined to be an absolute value or percentage of the current allocation 702. Further defined is a reduction function type, that may be configured with the following possible values: 1) one step (default), where the allocation will be reduced with one step (e.g., reduction step 762); 2) maximal reduction, where the reduction in the allocation will be applied down to the upper step bounding a limit on reduction 766; 3) growing reduction (e.g., growing reduction 764), which is applied if the reduction operations are subsequent to each other; or 4) automatic and adaptive reduction, which is based on historical data, as specified in the following.

A time period without a reduction operation resets the growing reduction 764 functionality. Various functions of the growing reduction 764 may be configured, for example, a reduction value in a previous reduction operation+1 step may be performed (e.g., where the values follow a pattern of 1 step, 2 steps, 3 steps, 4 steps, 5 steps, etc.). In another example, a reduction value in a previous reduction operation+a linearly growing step may be performed (e.g., where the values follow a pattern of 1 step, 3 steps, 6 steps, 10 steps, 15 steps, 21 steps, etc.).

In still another example, a reduction value in a previous operation×2 steps may be performed (e.g., where the values follow a pattern of 1 step, 2 steps, 4 steps, 8 steps, 16 steps, 32 steps, etc.). The limit on reduction 766 is further defined to enable the user to control the minimal allocation of the particular resource for the application instance. In some embodiments, there may be multiple limits on reduction that are mapped to different time periods (e.g., of day), which may be useful if the cost of resources varies depending on the time of day the resources are allocated and/or used. Reduction operations computed for a resource and an application instance will not reduce the allocation below the defined value (or values) of the limit on reduction 766 for that resource and application instance. Each pair of resource and application is further associated with an indication, which may be named as a critical resource for reduction indication.

If this critical resource for reduction indication is set to be true, and the limit on reduction 766 for the resource and application instance has already been reached while still attaining low tier 710 consumption, then an appropriate action will be taken, where the action is defined for the entire application instance and may include horizontal scaling of the application instance (e.g., removal of the application instance).

Automatic and Adaptive Increase and Reduction Based on Historical Data

Figure 8:
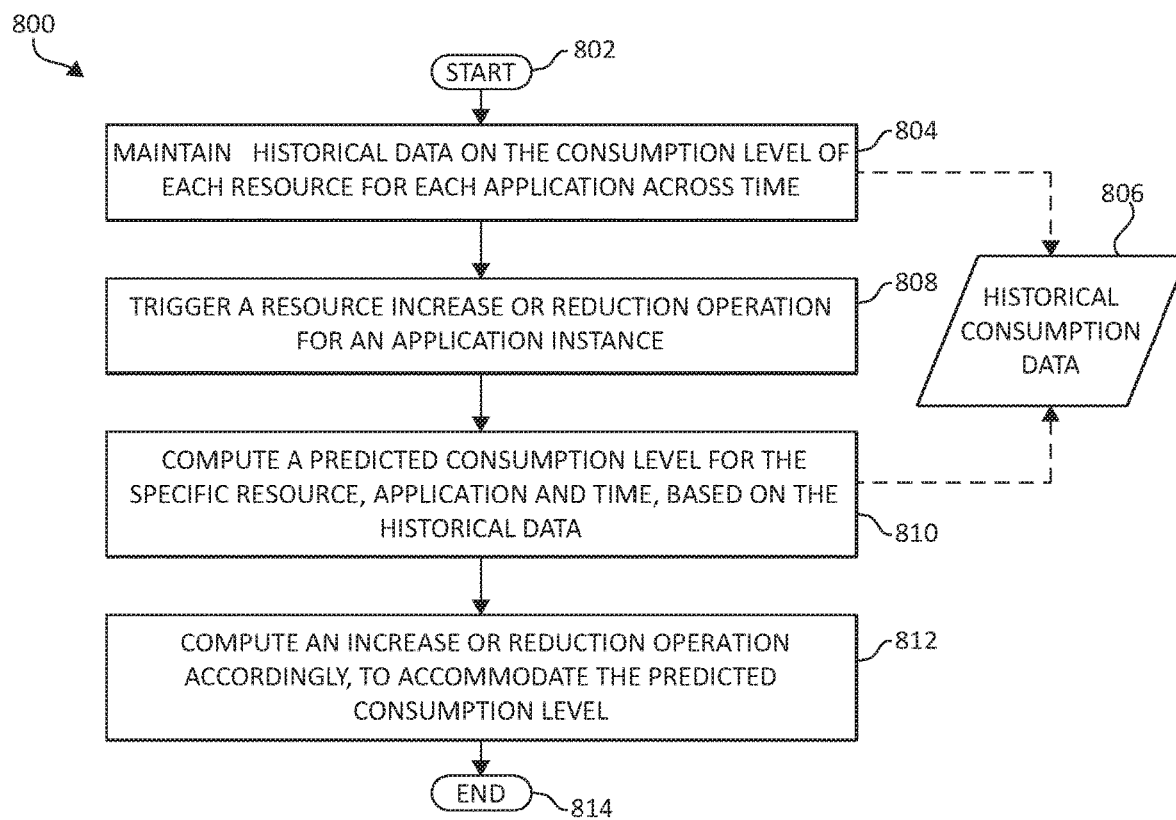
FIG. 8 illustrates a combination block/flowchart diagram depicting a method for automatic and adaptive increase and reduction of resources based on historical data, in accordance with aspects of the present invention.

FIG. 8 illustrates a combination block/flowchart diagram depicting a method 800 for automatic and adaptive increase and reduction of resources based on historical data, in accordance with aspects of the present invention. Beginning at step 802, the increase or reduction function type can be configured to be automatic and adaptive and based on historical data 806 held by the computing cluster. To implement this functionality, the mechanisms herein maintain historical consumption data 806 on the consumption level of each resource for each application across time (step 804). When an increase or reduction operation is triggered for an application instance (step 808), a predicted consumption level is computed based on the historical consumption data 806 for the specific resource, application, and time (although there may be additional attributes maintained and taken into consideration in the historical consumption data 806) (step 810). Then an increase or reduction operation is computed accordingly, to accommodate the predicted consumption level of the resource for the application (step 812). The method 800 ends (step 814).

Application Level Mechanism

Increase Method

Figure 9:
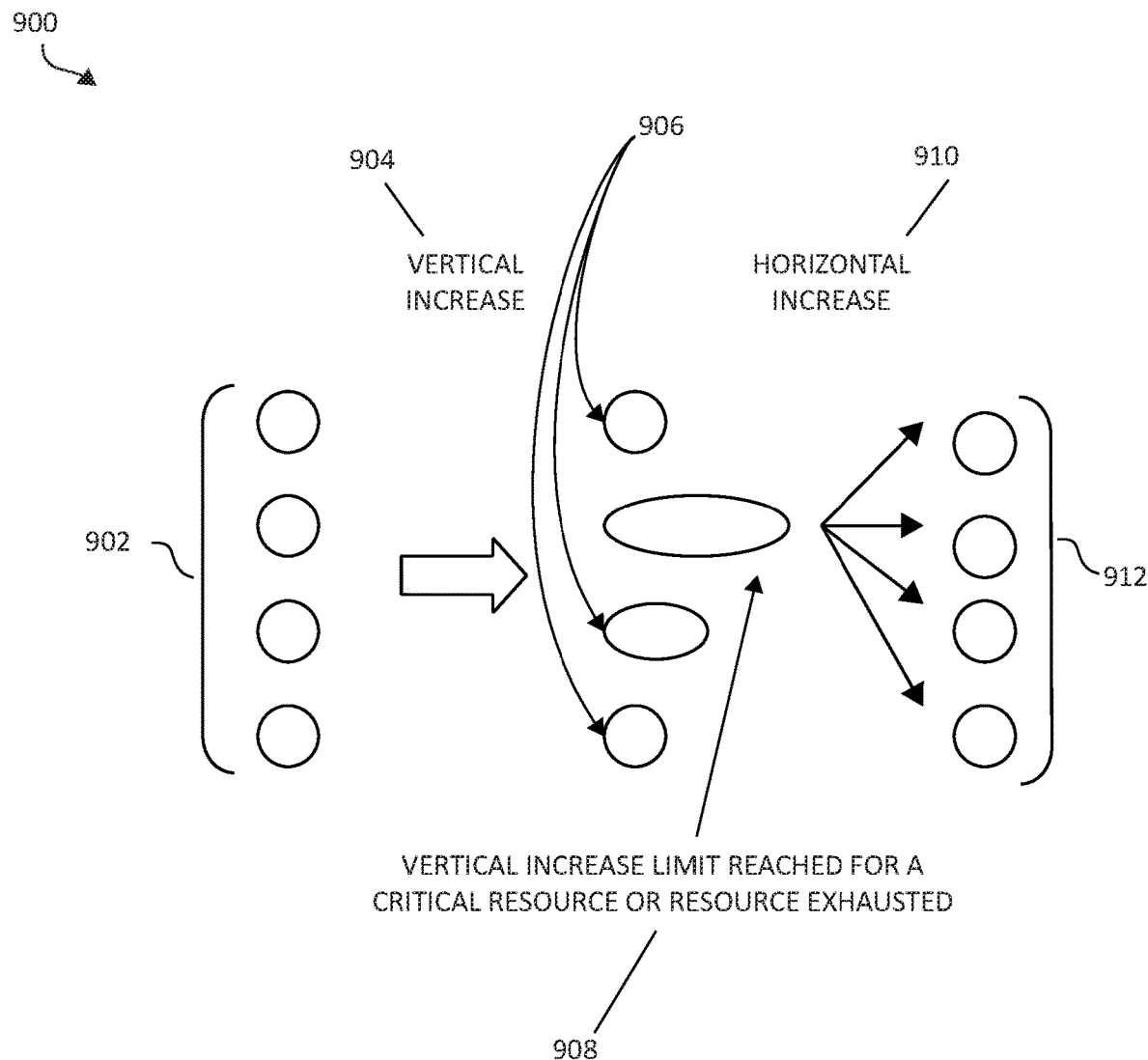
FIG. 9 illustrates a block diagram depicting exemplary diagonal scaling increase operations, in accordance with aspects of the present invention.

FIG. 9 illustrates a block diagram 900 depicting exemplary diagonal scaling increase operations, in accordance with aspects of the present invention. The operations start with a base number of instances of an application (902), where the base number may also be one application instance. Each of the application instances 902 are optionally defined with vertical scaling, and each application instance is computed for scaling operations independently. An additional option is to define a number of application instances under which only horizontal scaling will be performed, and above which, vertical scaling followed by horizontal scaling, will be performed. If this defined number of application instances equals the base number of application instances 902, then vertical scaling is applied first, followed by horizontal scaling. This scenario can be useful, for example, for stateful applications (having state data). Further, if this defined number of application instances is infinite, then vertical scaling is practically disabled, and only horizontal scaling operations will be performed. This scenario can be useful, for example, for stateless applications (having no state data). In all cases, however, the functionality of the described embodiments applies automatic tracking and computation of scaling requirements.

The operations automatically track the resource consumption of each application instance of the application instances (902), and compare the resource consumption of each application instance to the resource allocation thereof. In cases where an application instance's load grows, increase operations may be computed for allocation of resources assigned to a particular application instance. Following are several case examples for processing of a computed increase operation for a resource allocation of an application instance:

Case 1—Resource is available: If the vertical increase can be accommodated on the host (while considering resource availability and application priorities) and the application instance limit on increase 736 has not been reached, then a vertical increase operation is applied to the application instance (block 904), and vertical increase operations are subsequently continually applied on application instances which have not crossed the threshold of the limit on increase 736 (block 906) (note the application instances are represented as circles or ovals which grow larger during the vertical increase operations thereby denoting an amount of resources allocated to each respective application instance).

Case 2—Application instance limit on increase 736 has been reached: If the limit on increase 736 of the application instance for the resource has been reached, and the resource is configured as a critical resource for increase (block 908), then the application instance may be scaled further horizontally (block 910) with a defined number of created application instances 912 of the application. The additional application instances may inherit the current allocation of the particular resource of the saturated instance or receive a new base allocation of the resource.

Case 3—Host increase limit has been reached: If the resource is fully exhausted (while additionally considering application priorities) on the host, one or more predefined options may be performed as follows.

A first option comprises performing horizontal scaling as discussed above, by creating additional instances of the application on other hosts (such as shown in created application instances 912). This option is appropriate for stateless applications as state data is not required to create and/or make available for the additional application instances 912 on the other, or alternative, hosts.

A second option, which may be performed additionally or alternatively to the first option, comprises attempting to get allocation of the resource from other application instances. In this scenario, the lowest priority and least loaded application instances are computed, and requests are transmitted to these application instances to relinquish allocation of the resource. If, upon the application instances relinquishing allocation of the resource to the application instance in need of the resource fails to provide sufficient allocation of the resource, the application instance having the resource need may be migrated to another host where the resource is available for allocation. Further, if this migration is not possible, horizontal scaling may subsequently be performed as specified above, by creating additional application instances of the application on the other hosts. This option is appropriate for stateful applications (having state data).

Migration may be preferred over horizontal scaling for stateful applications because such applications may not support distribution/synchronization with regards to their state. Application data may also be migrated with an application instance.

Figure 10:
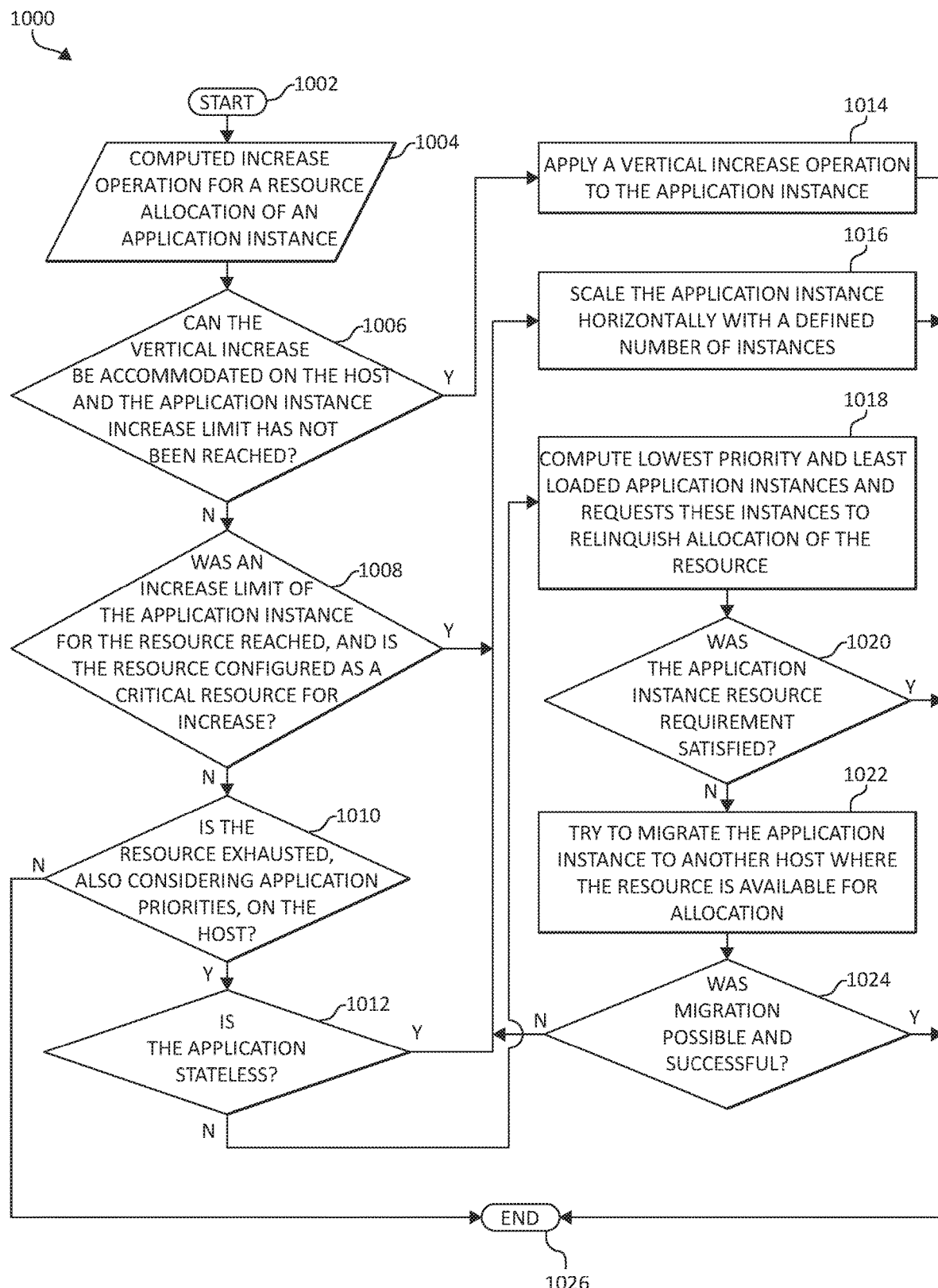
FIG. 10 illustrates a flowchart diagram depicting a method for processing a computed increase operation for a resource allocation of an application instance, in accordance with aspects of the present invention.

FIG. 10 illustrates a flowchart diagram depicting a method 1000 for processing a computed increase operation for a resource allocation of an application instance as described in the case scenarios previously, in accordance with aspects of the present invention. The method 1000 begins (step 1002) by receiving a computed increase operation for a resource allocation of an application instance, that must be performed due to one or more specific resource requirements necessitated by the application instance's workload (step 1004).

At step 1006, a determination is made as to whether a vertical increase (allocation of additional resources) can be accommodated on the host and the limit on increase 736 for the application instance has been reached. If the vertical increase can be accommodated on the host and the limit on increase 736 for the application instance has not been reached, the method 1000 proceeds to apply a vertical increase operation to the application instance by allocating additional resource(s) to the application instance (step 1014), and the method 1000 ends (step 1026).

Returning to step 1006, if the vertical increase cannot be accommodated on the host and/or the limit on increase 736 for the application instance has been reached, a further determination is made as to whether the limit on increase 736 for the application instance has indeed been reached, and if so, whether the resource is configured as a critical resource for increase (step 1008). If the limit on increase 736 for the application instance has been reached and the resource is configured as a critical resource for increase, the method 1000 proceeds to scale the application instance horizontally by adding or creating a defined number of additional application instances (step 1016), and the method 1000 ends (step 1026).

Returning to step 1008, if the limit on increase 736 for the application instance has not been reached yet, or the resource is not configured as a critical resource for increase, a further determination is made as to whether the resource is exhausted on the host while considering priorities of the applications (step 1010). If, at step 1010, the resource is not exhausted on the host while considering priorities of the applications, the method 1000 ends (step 1026).

Returning to step 1010, if the resource is exhausted on the host while considering priorities of the applications, a further determination is made as to whether the application is stateless (step 1012). If, at step 1012, the application is determined to be stateless, the method 1000 continues to scale the application instance horizontally by creating and adding a defined number of additional application instances to handle the workload thereof (step 1016), and the method 1000 ends (step 1026).

Returning to step 1012, if the application is determined to be stateful, the method 1000 continues to compute the lowest priority and least loaded application instances on the host and transmits a request for these (one or more) instance(s) to relinquish allocation of the needed resource to the application instance requiring the resource (step 1018). Upon completing this step, a determination is made as to whether the application instance resource requirement was satisfied by the re-allocation of the resource to the application instance necessitating the resource (step 1020). If, at step 1020, the resource requirement of the application instance was satisfied, the method 1000 ends (step 1026).

Returning to step 1020, if the resource requirement was not satisfied by the re-allocation of the resource to the application instance necessitating the resource, and/or no resources were able to be re-allocated to the application instance necessitating the resource by the other (alternative) application instance(s), an attempt is made to migrate the application instance necessitating the resource to another host where the resource is available for allocation (step 1022). Finally, a determination is made as to whether this migration was possible, and if so, successful at step 1024. If the migration was not possible and/or was not successful, the method 1000 returns to scaling the application instance horizontally with the defined number of created application instances (which may be on the same or other hosts as the base application instance), and the method 1000 ends (step 1026). Otherwise, at step 1024, if the migration was possible and was indeed successful, the method ends (step 1026).

To model the previously described scenarios and further encapsulate such into a user configured policy, an action for vertical increase limit reached or resource exhausted is defined. This action is performed when at least one critical resource for increase has reached its limit on increase 736 for the application instance or has been exhausted on the host executing the application instance, and high tier 704 consumption continues to be detected for the particular application instance. The action may be configured by the user with the following options: 1) to notify the user; 2) attempt to acquire resource allocation of the needed resource from other application instances; 3) migrate the application instance (to other or alternative host(s)); or 4) perform a horizontal increase. If the user specifies option 4 (to perform a horizontal increase operation), the user may additionally configure a number of additional application instances to create and what resource allocation (what amount of what resources) to apply for the additional application instances. This specified resource allocation may comprise a current allocation of the current application instance, or the newly created application instances may be configured to receive a new, base allocation of each specified resource.

Reduction Method

The objective of the reduction method is to release excessive resources from application instances, such that these resources may be reused (e.g., for other application instances necessitating the resource(s)). A general approach to this reduction may be defined as to first apply vertical reduction operations, and subsequently apply horizontal reduction operations, where vertical reduction operations are applied per resource, according to the automatic tracking of resource consumption techniques previously described.

To perform the horizontal reduction operations, an idle application instance is defined by means of the following two possible definitions:

1. System defined idle instance, wherein all the critical resources for reduction have reached their limit on reduction 766, and the consumption levels thereof have been detected at their respective low tier 710 for the time period for horizontal reduction operations.
2. User defined idle instance, wherein an interface is defined to run a user provided procedure/executable program to determine if a specific application instance is idle. This type of user logic is generally effective to check the load of an application instance.

These two aforementioned techniques may work in conjunction with one another. For example, when an idle application instance is identified based on the system definition, a user provided procedure may additionally be activated to verify the status of the application instance. Thus, when an idle application instance is identified, in accordance with the previously discussed techniques, the idle instance may be terminated and its allocated resources may be released to be reused for other application instances. Furthermore, the user may additionally configure a minimal number of instances to be retained for an application, and if such a minimal number of application instances is configured, an idle application instance will be terminated only if the current number of instances of the application is higher than the configured minimal number of instances for the application.

Figure 11:
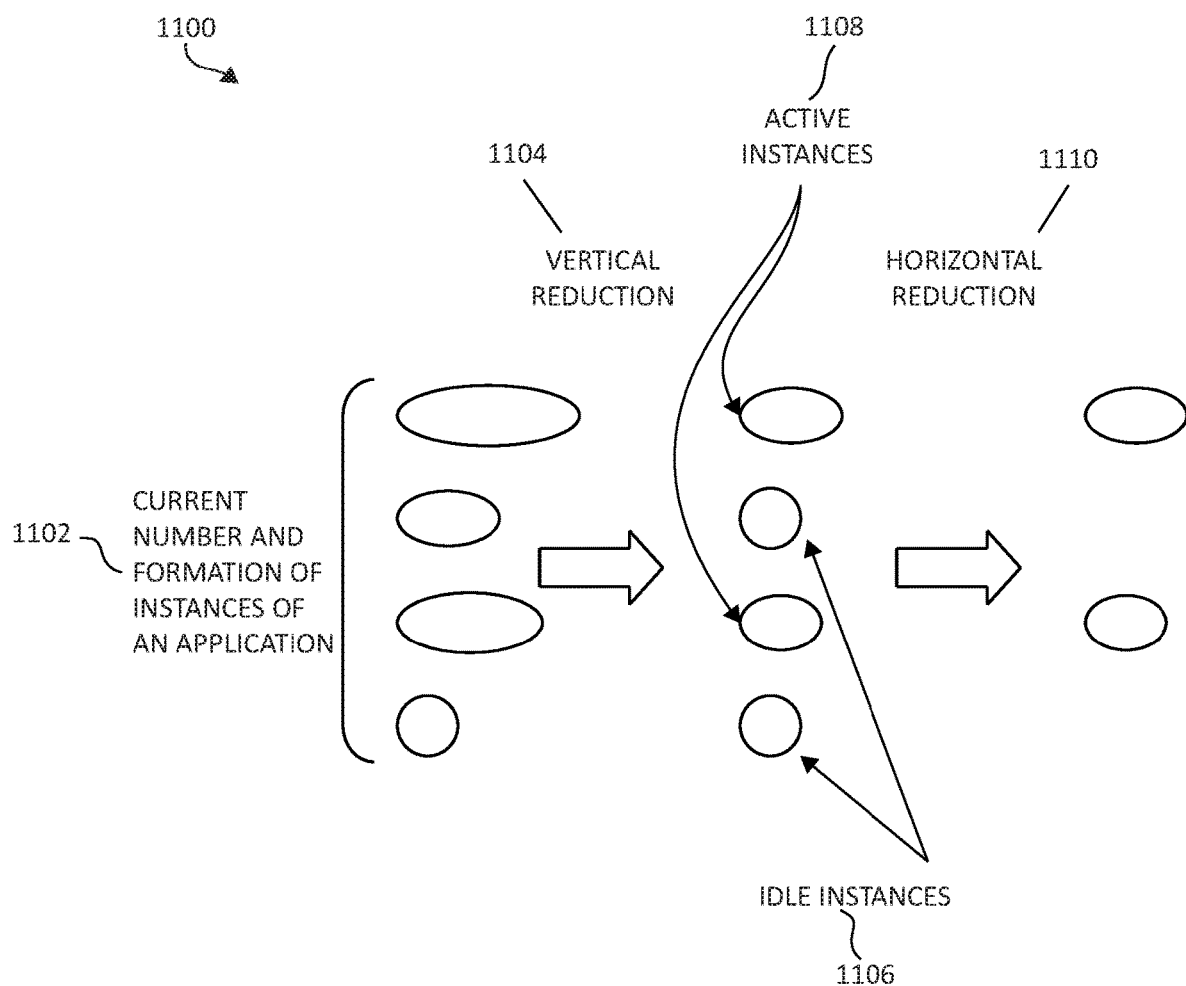
FIG. 11 illustrates a block diagram depicting exemplary diagonal scaling decrease operations, in accordance with aspects of the present invention.

FIG. 11 illustrates a block diagram 1100 depicting exemplary diagonal scaling decrease operations, in accordance with aspects of the present invention. The operations start with a current number and formation of instances of an application (current number of application instances 1102). That is, the operations begin by determining the current number of application instances 1102 and the amount of resources allocated to each respective instance (again denoted in diagram 1100 by how large the oval representing each application instance is). The resource consumption of each of the current application instances 1102 is monitored and tracked, and ultimately compared to the resource allocation of the application instances (again noting that each resource is individually monitored and tracked for each respective application instance). In cases where a particular application instance's load is reduced, vertical reduction operations may then be computed for reducing the amounts of resources allocated and assigned to the application instance (block 1104). Moreover, idle application instances may be identified using the methods previously discussed (idle instances 1106) while the rest of the application instances may be identified as active (active instances 1108). Based on this determination of idle application instances 1106, some or all of the identified idle application instances 1106 may be terminated. That is, horizontal reduction operations are performed to reduce or terminate the idle application instances 1106 (block 1110).

To enable the user to configure the above techniques for determining an application instance as idle, a horizontal reduction action indication is defined. If this indication is set to true for an application instance, and if for the particular application instance all the critical resources for reduction reached their limit on reduction 766, and their consumption levels for the particular application instance are detected to be sustained at the low tier 710 for a time period qualifying for horizontal reduction, then horizontal reduction action will be taken.

The horizontal reduction action can be configured by the user with the following options: 1) notify the user; or 2) terminate the application instance (gracefully or forcibly). Further defined by the user is the time period for horizontal reduction, which comprises the minimal duration of time in which the conditions of idleness should be satisfied in order for an application instance to be determined as idle.

Cluster Level Mechanism

Diagonal Scaling Algorithm

Figure 12:
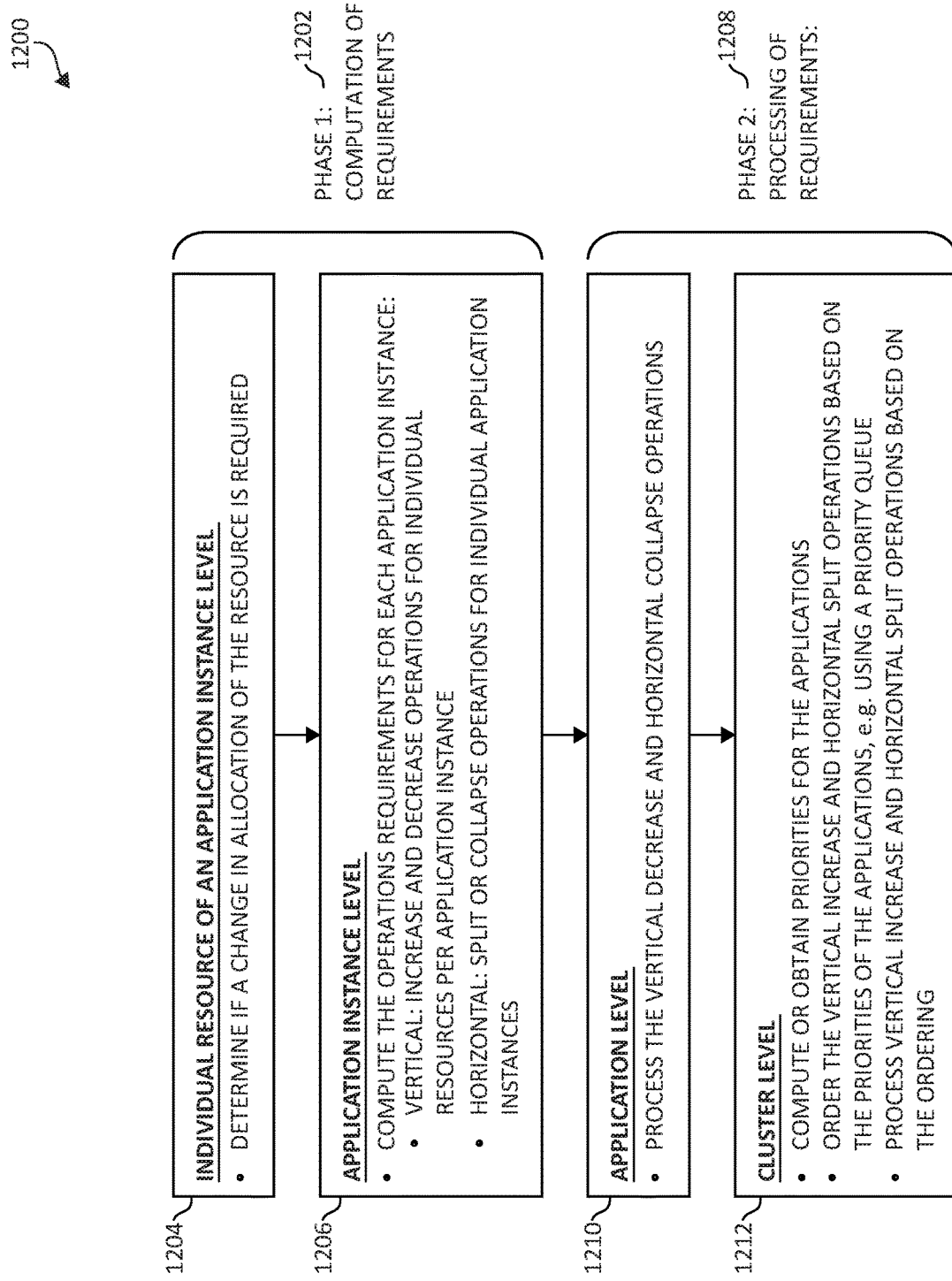
FIG. 12 illustrates a flowchart diagram depicting a diagonal scaling algorithm, in accordance with aspects of the present invention.

FIG. 12 illustrates a flowchart diagram 1200 depicting a high-level diagonal scaling algorithm, in accordance with aspects of the present invention. When considering the diagram 1200, the achieved objectives of the diagonal scaling algorithm are to both maximize throughput of the applications of the computing cluster, according to actual workload that is provided as input to the applications, priorities of the applications, and available resources; and minimize the cost of these resources. To achieve these objectives, the diagonal scaling algorithm computes required modifications of resource allocations based on actual consumption of specific resources per application instance, and subsequently computes actual operations according to application priorities and available resources.

The diagonal scaling algorithm begins with a first phase of computing resource requirements (phase 1202). This phase includes two steps, where the first (step 1204) focuses on the level of an individual resource of an individual application instance. In step 1204, the algorithm determines for each individual resource of an application instance if a change in allocation of the resource is required, using the methods as described previously. The second step in phase 1202 (step 1206) focuses on the application instance level. In step 1206, the algorithm computes the operations requirements for each application instance, using the methods as previously described. These computed operations requirements include both vertical and horizontal operations, where again, vertical scaling operations increase and decrease the allocation for individual resources per application instance, and horizontal scaling operations split or collapse instances of an application. Splitting an application instance denotes creating additional application instances, and collapsing an application instance denotes removing that application instance.

The diagonal scaling algorithm then proceeds to the second phase (phase 1208) of processing the requirements that were computed in the previous step. Phase 1208 includes two steps. The first step in phase 1208 (step 1210) focuses on the level of an application. That is, in step 1210, the algorithm processes the vertical decrease and horizontal collapse operations computed in step 1206, using the methods as previously described. The second step in phase 1208 (step 1212) focuses on the cluster level. Thus, in step 1212, the algorithm computes or obtains priorities for the applications and orders the vertical increase and horizontal split operations based on the priorities of the applications (e.g., using a priority queue). Prioritizing and ordering will be further discussed, following. Further in step 1212, the algorithm then processes the vertical increase and horizontal split operations based on the ordering, congruent with the description of FIGS. 9-11 examined previously.

Computing Priorities of Applications for Scaling Operations

Figure 13:
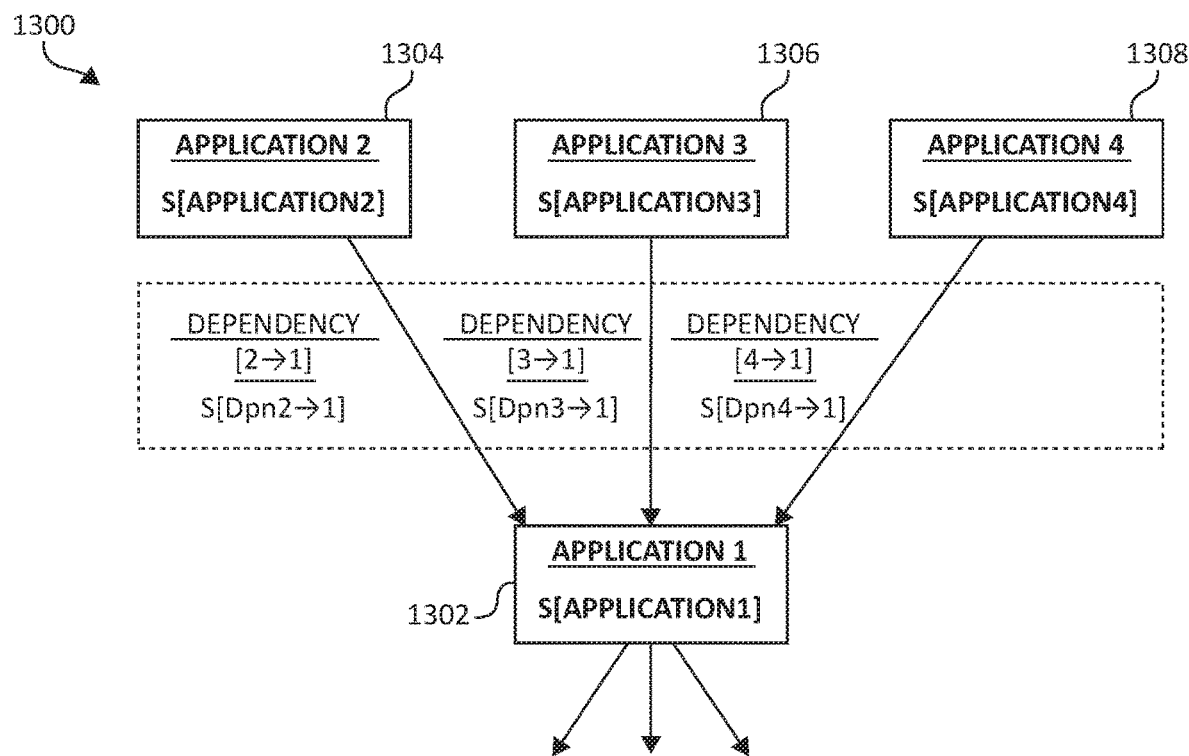
FIG. 13 illustrates a block diagram depicting exemplary application topologies for computing application priorities, in accordance with aspects of the present invention.

FIG. 13 illustrates a block diagram 1300 depicting exemplary application topologies for computing application priorities, in accordance with aspects of the present invention. Consider the applications topology shown in diagram 1300, where four applications are shown, namely application(1) 1302, application(2) 1304, application(3) 1306, and application(4) 1308. For each of the applications 1302-1308, a respective "S[application]" is defined therein as the significance (or importance) of the respective applications 1302-1308 or the functionality performed thereof. That is, the significance S[application1] of application(1) 1302 may have a higher importance (the application itself and/or the functionality performed by application(1) 1302) than the significance S[application2] of application(2) 1304, and so on. A scale for this application significance may comprise 5 exemplary levels, however these levels may be modified as required depending on implementation. In diagram 1300, each of the applications 1302-1308 is associated with its respective S[application] value.

Consider application(1) 1302 in diagram 1300. For application(1) 1302, the diagram 1300 illustrates an example for application dependencies, such that, in this example, application(2) 1304, application(3) 1306, and application(4) 1308 each hold dependencies on application(1) 1302, and additionally, application(1) 1302 holds dependencies on other applications (not shown). Assuming without loss of generality that all dependencies on application(1) 1302 are shown in this example, and for each dependency, S[dependency] (or S[dpn]) is defined as the significance (or importance) of the dependency of the dependent application on the antecedent application.

Further illustrated in diagram 1300, each of the dependencies between application(2) 1304, application(3) 1306, application(4) 1308 and application(1) 1302 is associated with a respective "S[dpn]" value. To illustrate the difference between the two types of significance, consider the following two examples: (1) Two important applications, where one application has a usage (or dependency) of the other yet where this usage is for a low importance functionality; and (2) Two low significance applications, where one application uses the other such that this usage facilitates the main functionality of the dependent application, hence having a high significance value for this dependency.

The user provides significance values for each application and dependency thereof. The diagonal scaling algorithm standardizes these significance values, computes priorities for the applications, and re-computes the priorities when the dependency topology is changed or when applications are added or removed from the cluster. Following is a formula by which the algorithm computes the priority of an application X:

$$\text{Priority [application } X] = \quad \text{A)}$$
$$W \times S[application\ X] + \quad \text{B)}$$
$$(1-W) \times \frac{\sum_{[application\ Y \in applications\ dependent\ on\ application\ X]} [S[dependency\ Y \to X] \times S[application\ Y]]}{[Divisor]}$$

In this formula, the first element (A) models the significance of the application and the second element (B) models the significance of the dependencies on the application. W is a relative weight of the application significance versus the significance of the dependencies on the application. An example range for the values of W may be 0 to 1, and W may have a default value. The significance values S[application or dependency] may also be standardized to a value range of 0 to 1.

To be more clear and as shown in formula (elements A and B) above, the priority of an application may be computed by 1) computing the first element as a product of the significance of the application and a first weight; 2) computing the second element by summarizing the products of the significance of the dependencies on the application and the significance of the dependent applications, dividing the summary with a divisor, and multiplying the result with a second weight; and 3) adding the first element and the second element.

The Divisor in the second element may be defined in several ways. Following are example embodiments for computing the Divisor:

$$\text{Divisor} = \text{Total number of application} - 1$$

$$\text{Divisor} = \underset{[\text{application } I \in \text{all applications}]}{\text{MAX}} \left[ \sum_{[\text{application } J \in \text{applications dependent on application } I]} 1 \right]$$

$$\text{Divisor} = \underset{[\text{application } I \in \text{all applications}]}{\text{MAX}}$$

$$\left[ \sum_{[\text{application } J \in \text{applications dependent on application } I]} S[\text{application } J] \right]$$

$$\text{Divisor} = \underset{[\text{application } I \in \text{all applications}]}{\text{MAX}}$$

$$\left[ \sum_{[\text{application } J \in \text{applications dependent on application } I]} S \right.$$

$$\left. [\text{dependency } J \to I] \times S[\text{application } J]] \right.$$

That is, the Divisor may be computed as 1) the total number of applications minus one, as in the first example; 2) the maximal number of dependencies on a given application from among all the applications; 3) the maximal sum of significance values of applications that are dependent on an application, among all applications; and/or 4) the maximal sum of the products of the significance values of applications that are dependent on an application with the significance values of the dependencies, among all applications.

It should be noted that if the significance values and W are both in the range of 0 to 1, then the prescribed formula for computing the priority of an application generates a value in the range of 0 to 1 for the given application.

The given algorithm has the following distinctive features: (1) The algorithm considers (i.e., uses as input) the significance of each dependency, while existing methods generally do not associate any significance value to the dependencies themselves; (2) The algorithm combines an application's significance with its respective dependency's significance, while existing methods typically do not associate an element to be ranked with inherent or user perceived significance; and (3) The algorithm enables a non-iterative computation of the application's priorities such that re-computation is required only when there is change in the topology of applications and their dependencies, or a change in the significance values. Existing methods typically use iterative computations, because the input is different and the type and scale of topology is different. Thus, the provided algorithm addresses a topology and scale that enable to perform an efficient non-iterative computation.

Example System Embodiment

Figure 14:
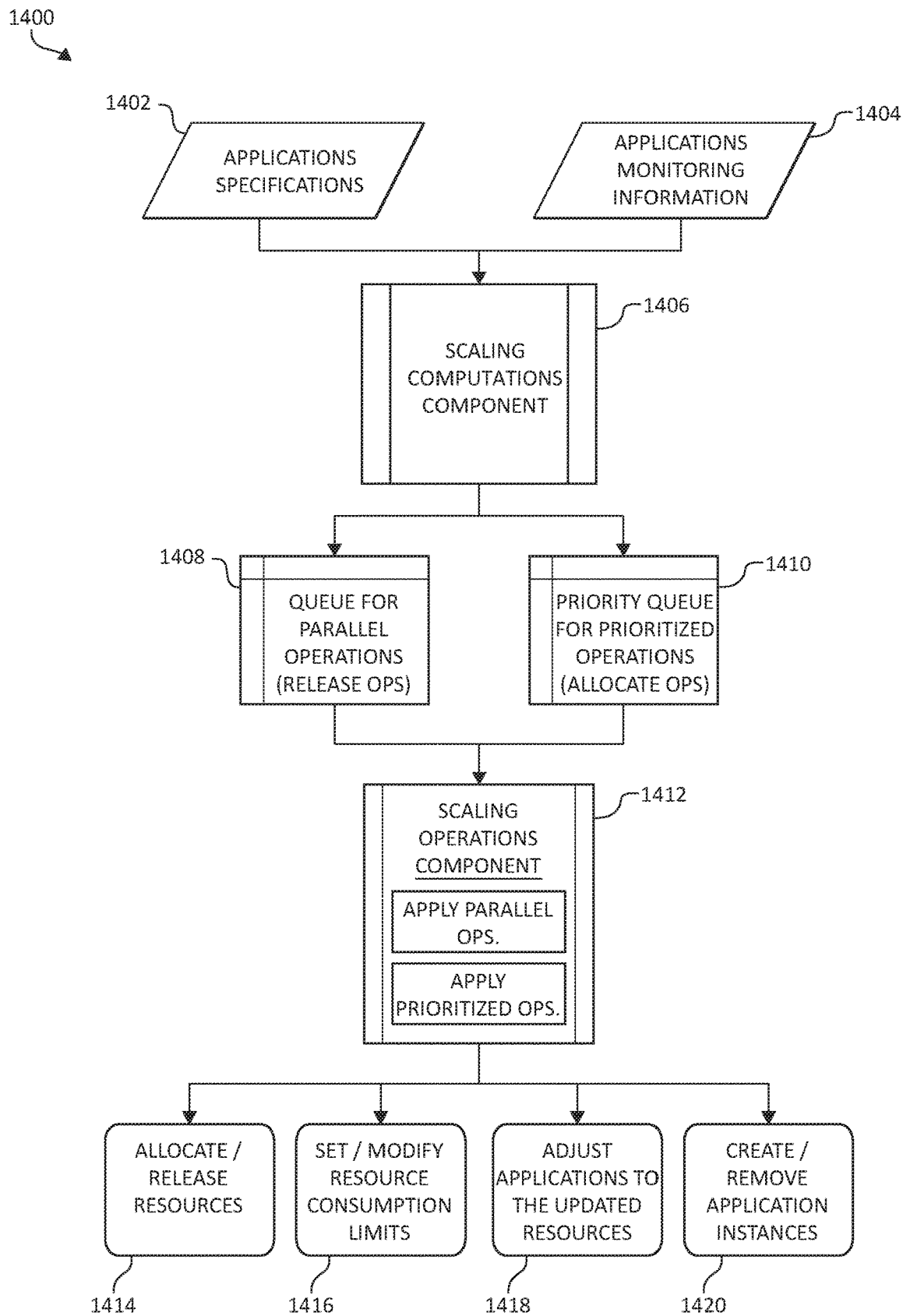
FIG. 14 illustrates a combination block/flowchart diagram depicting a method for automatic diagonal scaling of workloads in a distributed computing environment, in accordance with aspects of the present invention.

FIG. 14 illustrates a combination block/flowchart diagram 1400 depicting a system embodiment for automatic diagonal scaling of workloads in a distributed computing environment, in accordance with aspects of the present invention.

The inputs to the system are applications specifications (block 1402) and applications monitoring information (block 1404). A scaling computations component (block 1406) uses the applications specifications and priorities as discussed above, combined with the monitoring information of block 1404, to compute (i.e., calculate) scaling operations, which may be performed concurrently. The scaling computations component 1406 then adds the computed scaling operations as tasks to operations execution queues.

Two queues are defined: One queue for parallel operations (block 1408) (i.e., release operations of resources) and a second queue for prioritized operations (block 1410) (i.e., allocation operations of resources). A scaling operations component (block 1412) obtains tasks from the operations execution queues 1408 and 1410, and executes the tasks. The scaling operations component 1412 may also perform any combination of the following: (1) Compute and apply appropriate resource allocation and release operations using a system scheduler or resource manager (block 1414); (2) Set or modify resource consumption limits for application instances running on specific hosts (block 1416); (3) Adjust the configuration of the application instances to the updated resources available for the application instances (e.g., increase/decrease the number of threads within an application instance) (block 1418); and/or (4) Create and remove application instances (block 1420). It should be noted that the scaling operations component may be a distributed component, or use a distributed mechanism, and may apply independent operations concurrently.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for adaptive computation of a change in resource allocation using historical data in a distributed computing environment, by at least one processor, comprising:
   maintaining historical data on resource consumption levels of an application; and
   triggering one of an increase operation or reduction operation for a resource required by an application instance of the application;
   computing a predicted consumption level for the resource required by the application instance;
   computing and implementing one of the increase or reduction operation for the resource required by the application instance to accommodate the predicted consumption level, thereby optimizing application efficiency and resource utilization in the distributed computing environment;
   commensurate with the triggering of the increase or reduction operation for the application instance, performing each of:
      using as algorithmic input a current allocation of a specific resource used by a specific application instance;
      configuring a high tier and a low tier of resource consumption;
      computing an increase of allocation of the specific resource for the application instance, when sustained consumption at the high tier is identified; and
      computing a decrease of allocation of the specific resource for the application instance, when sustained consumption at the low tier is identified;
   configuring a qualifying time period of which the specific resource is determined to be sustainably consumed at one of the high tier and the low tier, wherein an allocation change is computed for the specific resource upon the specific resource meeting the qualifying time period at the sustained consumption; and
   identifying the sustained consumption when no more than an outlying percentage of samples are outside of either one of the high or the low tier for a duration of the qualifying time period; and wherein the qualifying time period is one of fixed or implemented as a sliding window over time.

2. The method of claim 1, wherein:
   the maintaining historical data on the resource consumption levels is applied for each resource used by the application across a historical time period; and
   the predicted consumption level is computed based on the historical data.

3. The method of claim 2, wherein the computing the predicted consumption level is applied for the specific resource used by the application for a specific future time.

4. The method of claim 3, wherein at least one of a plurality of additional attributes are maintained in the historical data, the at least one of the plurality of additional attributes used as input when computing the predicted consumption level based on the historical data.

5. A system for adaptive computation of a change in resource allocation using historical data in a distributed computing environment, the system comprising:
at least one processor coupled to a memory storing computer readable program instructions that, when executed by the at least one processor:
maintain historical data on resource consumption levels of an application; and
trigger one of an increase operation or reduction operation for a resource required by an application instance of the application;
compute a predicted consumption level for the resource required by the application instance;
compute and implement one of the increase or reduction operation for the resource required by the application instance to accommodate the predicted consumption level, thereby optimizing application efficiency and resource utilization in the distributed computing environment;
commensurate with the triggering of the increase or reduction operation for the application instance, performing each of:
using as algorithmic input a current allocation of a specific resource used by a specific application instance;
configuring a high tier and a low tier of resource consumption;
computing an increase of allocation of the specific resource for the application instance, when sustained consumption at the high tier is identified; and
computing a decrease of allocation of the specific resource for the application instance, when sustained consumption at the low tier is identified;
configure a qualifying time period of which the specific resource is determined to be sustainably consumed at one of the high tier and the low tier, wherein an allocation change is computed for the specific resource upon the specific resource meeting the qualifying time period at the sustained consumption; and
identify the sustained consumption when no more than an outlying percentage of samples are outside of either one of the high or the low tier for a duration of the qualifying time period; and wherein the qualifying time period is one of fixed or implemented as a sliding window over time.

6. The system of claim 5, wherein:
the maintaining historical data on the resource consumption levels is applied for each resource used by the application across a historical time period; and
the predicted consumption level is computed based on the historical data.

7. The system of claim 6, wherein the computing the predicted consumption level is applied for the specific resource used by the application for a specific future time.

8. The system of claim 7, wherein at least one of a plurality of additional attributes are maintained in the historical data, the at least one of the plurality of additional attributes used as input when computing the predicted consumption level based on the historical data.

9. A computer program product for adaptive computation of a change in resource allocation using historical data in a distributed computing environment, by at least one processor, the computer program product embodied on a non-transitory computer-readable storage medium having computer-readable program code portions stored therein, the computer-readable program code portions comprising:
an executable portion that maintains historical data on resource consumption levels of an application;
an executable portion that triggers one of an increase operation or reduction operation for a resource required by an application instance of the application;
an executable portion that computes a predicted consumption level for the resource required by the application instance;
an executable portion that computes and implements one of the increase or reduction operation for the resource required by the application instance to accommodate the predicted consumption level, thereby optimizing application efficiency and resource utilization in the distributed computing environment;
an executable portion that, commensurate with the triggering of the increase or reduction operation for the application instance, performing each of:
using as algorithmic input a current allocation of a specific resource used by a specific application instance;
configuring a high tier and a low tier of resource consumption;
computing an increase of allocation of the specific resource for the application instance, when sustained consumption at the high tier is identified; and
computing a decrease of allocation of the specific resource for the application instance, when sustained consumption at the low tier is identified;
an executable portion that configures a qualifying time period of which the specific resource is determined to be sustainably consumed at one of the high tier and the low tier, wherein an allocation change is computed for the specific resource upon the specific resource meeting the qualifying time period at the sustained consumption; and
an executable portion that identifies the sustained consumption when no more than an outlying percentage of samples are outside of either one of the high or the low tier for a duration of the qualifying time period; and wherein the qualifying time period is one of fixed or implemented as a sliding window over time.

10. The computer program product of claim 9, wherein:
the maintaining historical data on the resource consumption levels is applied for each resource used by the application across a historical time period; and
the predicted consumption level is computed based on the historical data.

11. The computer program product of claim 10, wherein the computing the predicted consumption level is applied for the specific resource used by the application for a specific future time.

12. The computer program product of claim 11, wherein at least one of a plurality of additional attributes are maintained in the historical data, the at least one of the plurality of additional attributes used as input when computing the predicted consumption level based on the historical data.

* * * * *